United States Patent [19]

Shinzawa

[11] Patent Number: 4,756,155
[45] Date of Patent: Jul. 12, 1988

[54] EXHAUST PARTICLE REMOVING SYSTEM FOR AN INTERNAL COMBUSTION ENGINE

[75] Inventor: Motohiro Shinzawa, Yokosuka, Japan

[73] Assignee: Nissan Motor Company, Ltd., Kanagawa, Japan

[21] Appl. No.: 842,360

[22] Filed: Mar. 19, 1986

[30] Foreign Application Priority Data

Mar. 26, 1985 [JP] Japan ................................ 60-59471
Apr. 3, 1985 [JP] Japan ............................ 60-48736[U]
May 29, 1985 [JP] Japan ................................ 60-113997

[51] Int. Cl.$^4$ .............................................. F01N 3/02
[52] U.S. Cl. ........................................ 60/285; 60/278
[58] Field of Search ................................... 60/285, 278

[56] References Cited

U.S. PATENT DOCUMENTS 4,211,075  7/1980  Ludecke ................................ 60/285
4,467,601  8/1984  Watanabe ............................. 60/285

FOREIGN PATENT DOCUMENTS 1509944  4/1978  United Kingdom .

*Primary Examiner*—Douglas Hart
*Attorney, Agent, or Firm*—Lowe, Price, LeBlanc, Becker & Shur

[57] ABSTRACT

A filter traps particles in exhaust from an engine. When the degree of clogging of the filter is unacceptable, the flow of intake air into the engine is throttled to increase the temperature of exhaust from the engine and thereby to burn off the particles trapped by the filter. During throttling of the intake air flow, the pressure of the intake air may be adjusted in accordance with an engine operating condition. An arrangement for finely adjusting the degree of throttling of the intake air may be added. In cases where the exhaust is recirculated through the engine, the rate of the exhaust recirculation is reduced when the intake air flow is throttled to burn off the trapped particles.

12 Claims, 14 Drawing Sheets

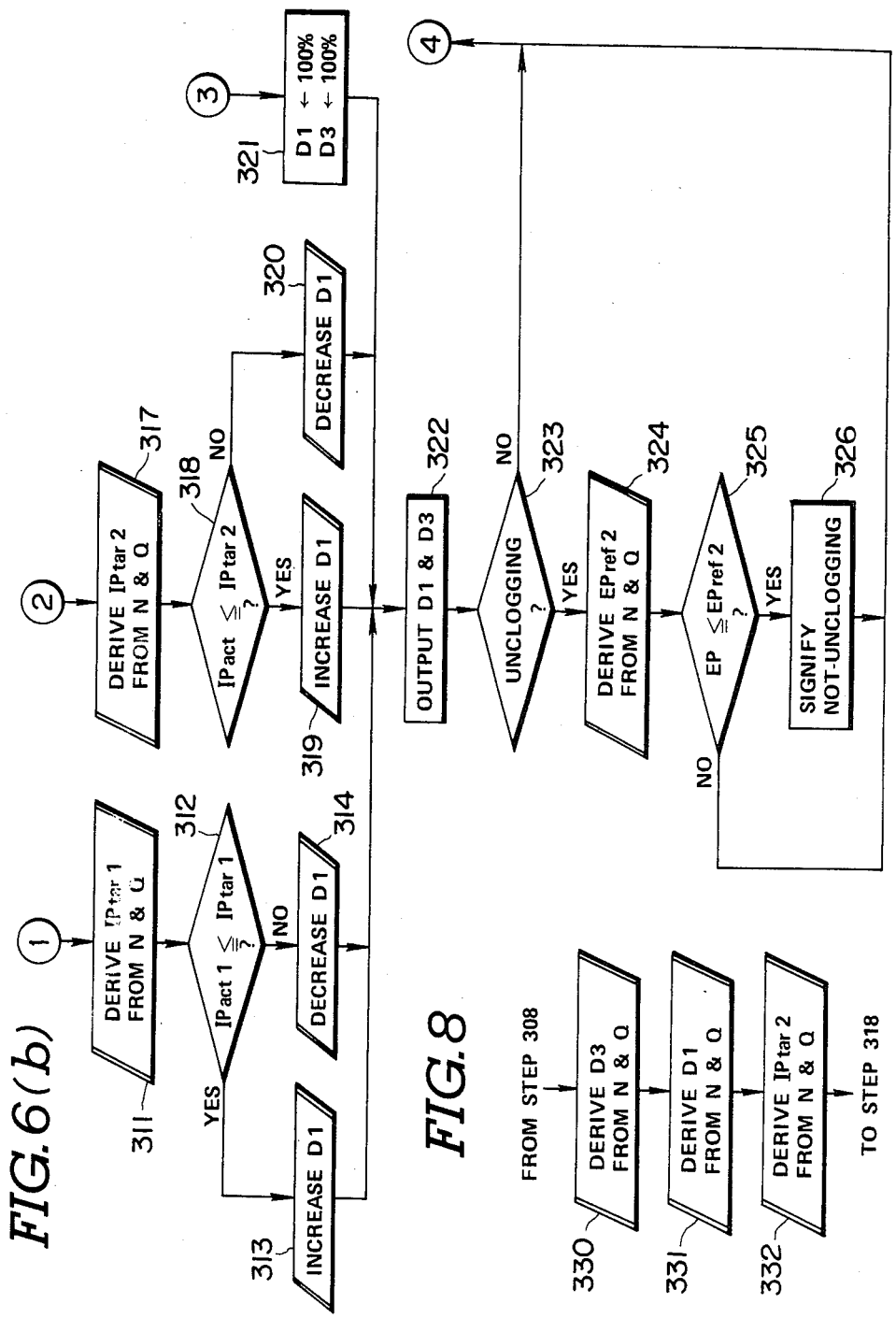

FIG. 11
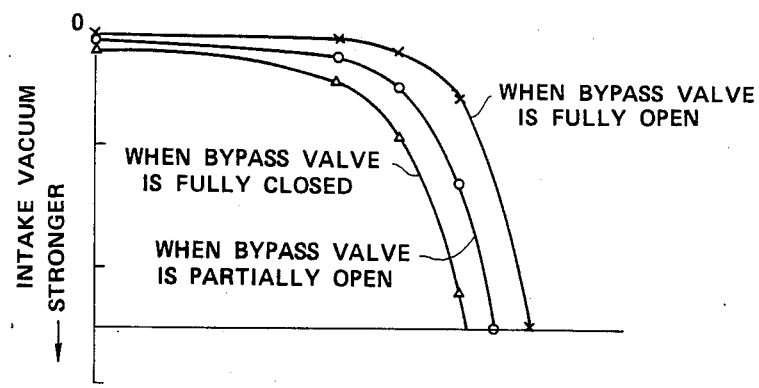
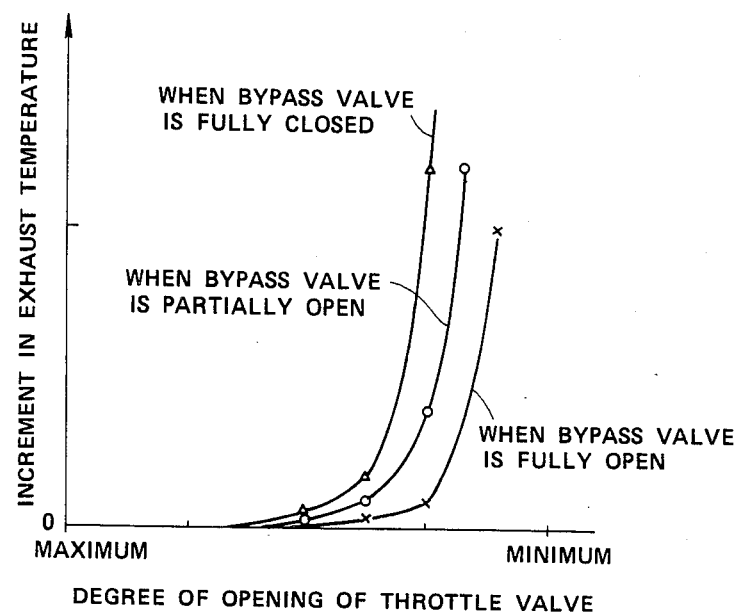

EXHAUST PARTICLE REMOVING SYSTEM FOR AN INTERNAL COMBUSTION ENGINE

BACKGROUND OF THE INVENTION

1. Field of the Invention

This invention relates to a system for removing particles from exhaust produced by internal combustion engines, such as diesel engines.

2. Description of the Prior Art

Exhaust from diesel engines has a relatively high content of polluting particles composed of carbon, unburned fuel, and partially burned fuel. Filters disposed in engine exhaust systems are conventionally used to remove the particles from the exhaust. As the amount of particles trapped by the filter increases, an engine exhaust back pressure rises and the efficiency of the filter decreases. When the degree of clogging of the filter is unacceptable, the trapped particles should be removed to unclog and rejuvenate the filter.

Most diesel engines have unthrottled air intakes wholly independent of the fuel supply so that the air/fuel mixture is always much leaner than stoichiometric. However, some recently developed engines employ intake valves capable of throttling the air flow and thus increasing the temperature of the engine exhaust.

Japanese patent publication No. 58-51235 discloses an exhaust particle removing system of this sort including a filter and an air flow throttle valve. In this system, when the exhaust filter is to be rejuvenated, the throttle valve reduces the rate of intake air flow, increasing the temperature of engine exhaust and thereby burning off the particles deposited on the filter. This system also includes a device for determining whether or not engine operating conditions derived from the engine speed and the engine load are suited for throttling of the intake air flow. When the engine operating conditions are determined to be unsuitable for unclogging of the filter, the air flow rate is not throttled even if the filter must be rejuvenated. Furthermore, during unclogging of the filter, the position of the throttle valve is adjusted so that the presure at a point within the engine air intake system downstream of the throttle valve will remain at a predetermined constant level corresponding to the lower limit of a range where fuel ignites reliably.

The exhaust particle removing system disclosed in the above-mentioned Japanese document has some drawbacks. First, at high engine loads, the reduction of the air flow rate needed to unclog the filter is performed to excessive degrees so that the engine fuel economy deteriorates and smoke emission increases. Second, it is difficult to finely adjust the degree of throttling of the intake air flow. In addition, the exhaust particle removing system is not designed for use with an exhaust gas recirculation (EGR) system used to reduce engine NOx (nitrogen oxides) emissions.

SUMMARY OF THE INVENTION

It is an object of this invention to provide a more sophisticated exhaust particle removing system for an internal combustion engine.

In accordance with this invention, a filter traps particles in exhaust from an engine. When the degree of clogging of the filter is unacceptable, the flow of intake air into the engine is throttled to increase the temperature of exhaust from the engine and thereby to burn off the particles trapped by the filter. During throttling of the intake air flow, the pressure of the intake air may be adjusted in accordance with an engine operating condition. An arrangement for finely adjusting the degree of throttling of the intake air may be added. In cases where the exhaust is recirculated through the engine, the rate of exhaust recirculation is reduced while the intake air flow is being throttled to burn off the trapped particles.

BRIEF DESCRIPTION OF THE DRAWINGS

FIGS. 6(a) and 6(b) form a flowchart of a program for operating the control unit of FIG. 5.

FIG. 8 is part of a flowchart of a modified program for operating the control unit of FIG. 5.

FIG. 11 is a graph of the relationship between degree of opening of the throttle valve and increase in exhaust temperature, and the relationship between degree of opening of the throttle valve and intake air pressure at three different positions of the bypass valve in the system of FIG. 10.

Like and corresponding elements are denoted by the same reference characters throughout the drawings.

DESCRIPTION OF THE FIRST PREFERRED EMBODIMENT

Figure 1:
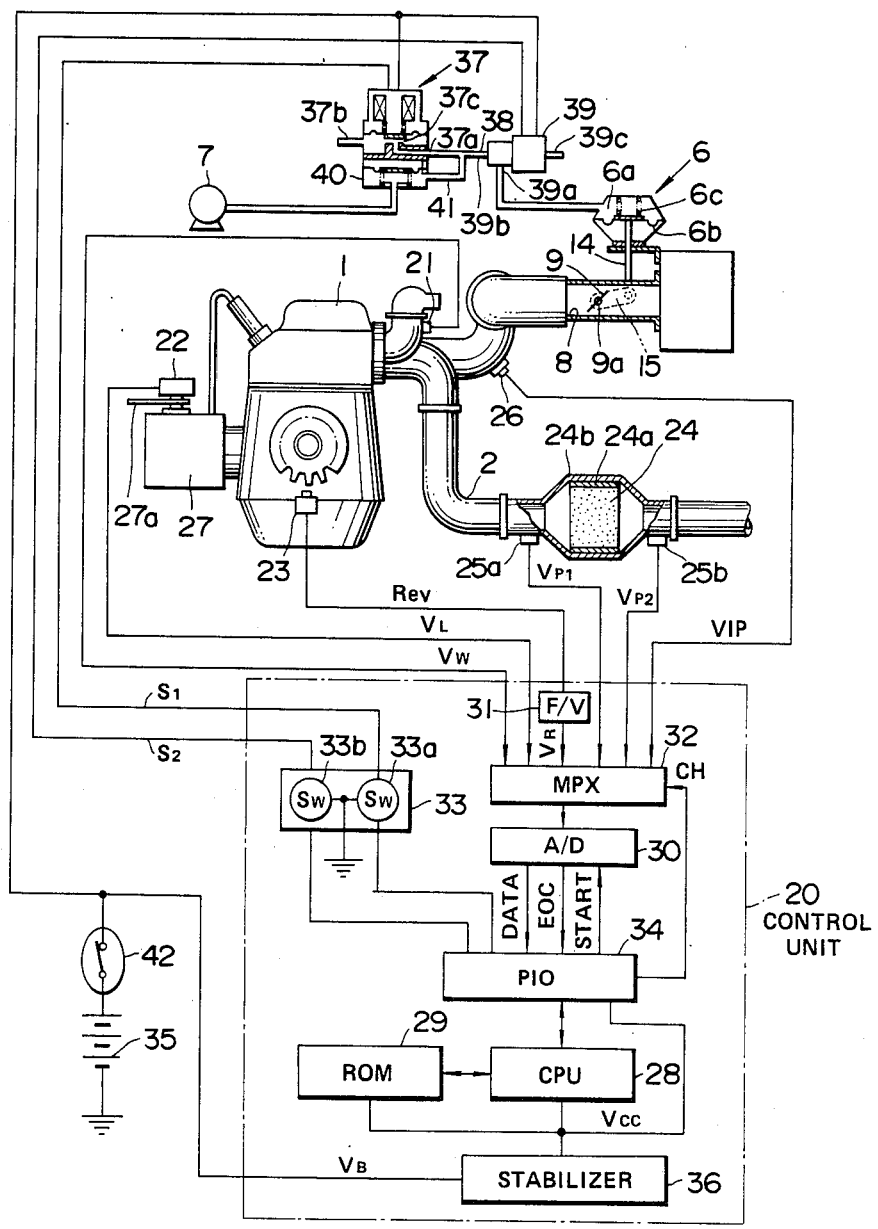
FIG. 1 is a diagram of an exhaust particle removing system according to a first embodiment of this invention.

With reference to FIG. 1 showing a first embodiment of this invention, an internal combustion engine 1, such as a diesel engine, has an exhaust passage 2 within which a catalyst-equipped filter 24 is disposed. It should be noted that the filter 24 need not employ a catalyst. The filter 24 traps particles and thus separates them from exhaust gases. A casing 24b retains the filter 24. A buffer 24a is interposed between the filter 24 and the casing 24b.

A pressure-responsive actuator 6 is exposed to a control pressure derived from a vacuum generated by a vacuum pump 7. The engine 1 has an air intake passage 8 within which a valve 9 is pivotably disposed. The valve 9 is driven by the actuator 6. The rate of intake air flow into the engine 1 depends on the position of the valve 9. When the intake air flow is throttled by the valve 9, the temperature of engine exhaust rises. It should be noted that the engine 1 is always supplied with air at a rate high enough to ensure an excessively lean air/fuel mixture. In general, when the filter 24 is to be rejuvenated, the valve 9 reduces the rate of intake air flow, increasing the temperature of engine exhaust and thereby burning off the particles deposited on the filter 24.

The actuator 6 includes a control chamber 6a, a diaphragm 6b defining part of the control chamber 6a, and a spring 6c urging the diaphragm 6b. A rod 14 fixed to the diaphram 6b is linked via a lever 15 to a shaft 9a on which the valve 9 is mounted. As the pressure within the control chamber 6a varies, the diaphragm 6b moves and thus the lever 15 rotates, pivoting the valve 9 about the shaft 9a. In this way, the position of the valve 9 depends on the pressure within the control chamber 6a. As the pressure within the control chamber 6a decreases, the degree of throttling of the intake air flow increases.

A temperature sensor 21 generates an analog signal VW representing the temperature of engine coolant.

A sensor 22 generates an analog signal VL representing the load on the engine 1, that is, the power output required of the engine 1. Specifically, the engine load sensor 22 includes a potentiometer which is connected to a fuel injection rate control level 27a of a fuel injection pump 27 to detect the position of the lever 27a. Since the lever 27a is linked to an accelerator pedal, the position of the lever 27a signifies the power output required of the engine 1, that is, the load on the engine 1.

A rotational speed sensor 23 generates a signal Rev representing the rotational speed of the crankshaft of the engine 1. Specifically, the engine speed sensor 23 includes a crank angle sensor which generates pulses at a frequency proportional to the engine speed.

A pressure sensor 25a generates an analog signal VP1 representing the pressure at a point within the exhaust passage 2 upstream of the filter 24. This pressure sensor 25a may be of the semiconductor type.

A pressure sensor 25b generates an analog signal VP2 representing the pressure at a point within the exhaust passage 2 downstream of the filter 24. This pressure sensor 25b may be of the semiconductor type.

A pressure sensor 26 generates an analog signal VIP representing the pressure at a point within the air intake passage 8 downstream of the valve 9, which is generally called the intake manifold pressure or the intake air pressure. Specifically, the sensor 26 measures absolute pressure. The pressure sensor 26 may be of the semiconductor type.

A control unit 20 includes the combination of a central processing unit (CPU) 28, a read-only memory (ROM) 29, and a peripheral input/output (PIO) circuit 34. The CPU 28 has an internal random-access memory (RAM). The control unit 20 also includes an analog-to-digital (A/D) converter 30, a frequency-to-voltage (F/V) converter 31, and a multiplexer (MPX) 32. The F/V converter 31 derives a voltage signal VR from the pulse signal Rev. The voltage of the signal VR varies with the frequency of the signal Rev. Since the frequency of the signal Rev is proportional to the engine speed, the voltage of the signal VR represents the engine speed.

The multiplexer 32 receives the analog signals VW, VL, VR, VP1, VP2, and VIP from the elements 21, 22, 31, 25a, 25b, and 26 respectively. The multiplexer 32 selects one of these signals in accordance with a channel selection signal CH issued by the PIO circuit 34 and passes it to the A/D converter 30. The selection signal CH has six different states corresponding to the six different selections. After receiving a start signal START from the PIO circuit 34, the A/D converter 30 commences converting the selected signal into a corresponding digital signal DATA. The A/D converter 30 outputs an end-of-conversion signal EOC to the PIO circuit 34 upon completion of the conversion, and then the digital signal DATA is transmitted to the PIO circuit 34.

A battery 35 is electrically connected via an engine key switch 42 to the input terminal of a voltage stabilizer 36 included in the control unit 20. The votage VB across the battery 35 is applied to the input terminal of the voltage stabilizer 36, provided that the engine key switch 42 is closed. The voltage stabilizer 36 derives a constant voltage Vcc from the battery voltage VB. Electrical elements 28–34 within the control unit 20 are all powered by the constant voltage Vcc.

The control unit 20 includes a switch section 33 having switching circuits 33a and 33b. These switches 33a and 33b have control terminals receiving signals from the PIO circuit 34. The switches 33a and 33b are closed and opened in accordance with states of these signals. Each of the switches 33a and 33b is mainly composed of a switching transistor.

An electromagnetic valve 37 is electrically connected across the battery 35 via the switch 33a and the engine key switch 42. Provided that the key switch 42 is closed, the electromagnetic valve 37 is energized and de-energized when the switch 33a is closed and opened respectively. In other words, the electromagnetic valve 37 is electrically energized and de-energized by a control signal S1 supplied from the switch 33a to the electromagnetic valve 37. This control signal S1 reflects the signal from the PIO circuit 34 to the switch circuit 33a.

An electromagnetic valve 39 is electrically connected across the battery 35 via the switch 33b and the engine key switch 42. Provided that the key switch 42 is closed, the electromagnetic valve 39 is energized and de-energized when the switch 33b is closed and opened respectively. In other words, the electromagnetic valve 39 is electrically energized and de-energized by a control signal S2 supplied from the switch 33b to the electromagnetic valve 39. This control signal S2 reflects the signal from the PIO circuit 34 to the switch 33b.

The electromagnetic valve 37 is of the ON/OFF type, having two ports 37a and 37b. The first port 37a leads to a pressure control passage 38. The second port 37b opens to atmosphere. The electromagnetic valve 39 is of the three-way type, having three ports 39a, 39b, and 39c. The first port 39a is connected to the control chamber 6a of the actuator 6. The second port 39b opens to the pressure control passage 38. The third port 39c leads to atmosphere. The vacuum pump 7 is connected to the pressure control passage 38 via a pressure adjustment valve 40 and a passage 41 so that vacuum can be applied to the pressure control passage 38.

When the electromagnetic valve 37 is energized, a valve opening 37c between the ports 37a and 37b is unblocked so that atmosphere is admitted into the pressure control passage 38, thereby increasing the pressure within the pressure control passage 38. When the electromagnetic valve 37 is de-energized, the valve opening 37c is blocked so that the admission of atmosphere into the pressure control passage 38 is interrupted, thereby decreasing the pressure within the pressure control passage 38. The control signal S1 reflecting the signal from the PIO circuit 34 to the switch 33a is in the form of a pulse train having a frequency in the range of 30–50 Hz so that the electromagnetic valve 37 is periodically energized and de-energized at that frequency. This pulse drive of the electromagnetic valve 37 allows the pressure within the pressure control passage 38 to depend on the duty cycle of the pulse signal S1.

When the electromagnetic valve 39 is energized, the first port 39a is connected to the second port 39b and is disconnected from the third port 39c so that the control chamber 6a of the actuator 6 is exposed to the control pressure developed in the passage 38. In this case, the position of the throttle valve 9 is adjusted in accordance with the duty cycle of the control signal S1. When the electromagnetic valve 39 is de-energized, the first port 39a is connected to the third port 39c and is disconnected from the second port 39b so that the control chamber 6a of the actuator 6 is exposed to atmospheric pressure. In this case, the throttle valve 9 is held in its maximal open position at which essentially free flow of intake air is allowed.

Figure 2:
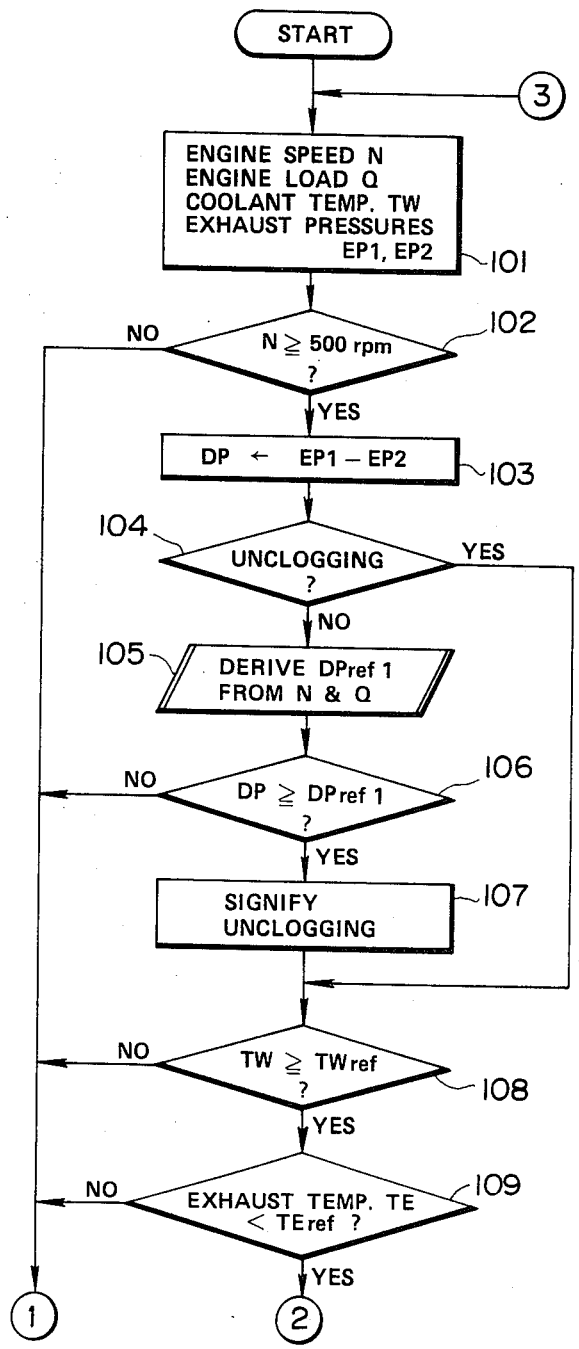
FIGS. 2(a), 2(b), and 2(c) together form a flowchart of a program for operating the control unit of FIG. 1.
Figure 2B:
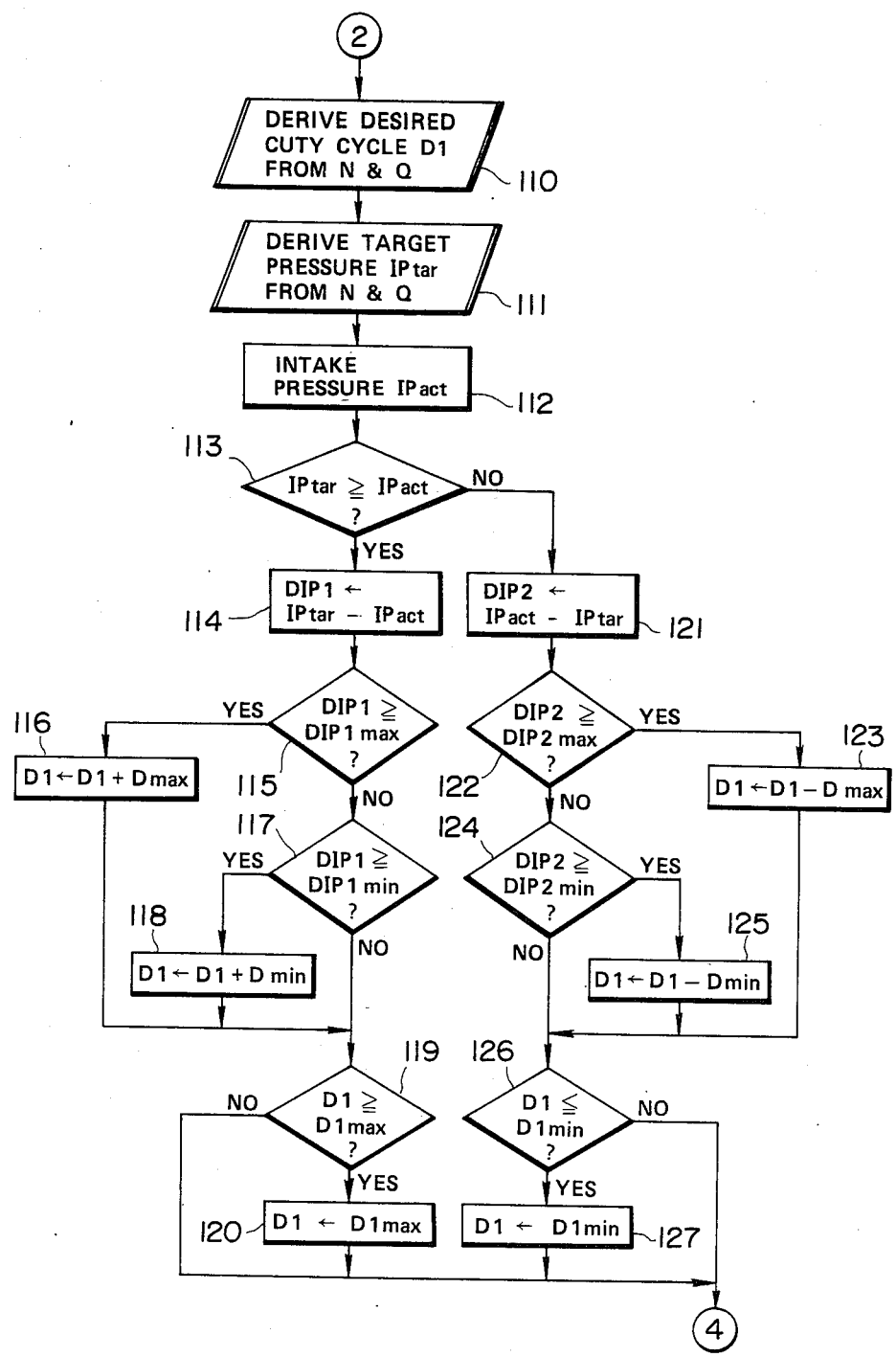
Figure 2C:
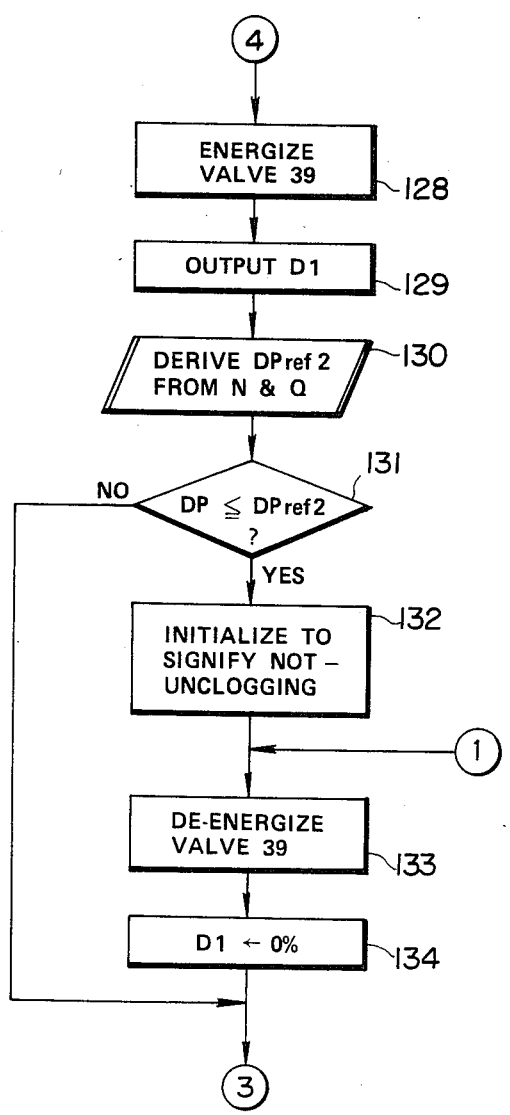

The control unit 20 operates in accordance with a program stored in the ROM 29. FIGS. 2(a), 2(b), and 2(c) form a flowchart of this program.

In a step 101 of the program, the current values of engine speed N, engine load Q, coolant temperature TW, and exhaust pressures EP1 and EP2 upstream and downstream of the filter 24 are derived from the signals VR, VL, VW, VP1, and VP2, respectively. The RAM within the CPU 28 holds these values.

A step 102 following the step 101 compares the current engine speed N to a preset, relatively low engine speed, e.g., 500 rpm. This comparison is to determine whether or not the engine 1 has been started. If the engine speed N is equal to or higher than 500 rpm, that is, if the engine 1 is running, the program advances to a step 103. If the engine speed N is lower than 500 rpm, that is, if the engine 1 has not yet been started, the program advances to a step 133.

In the step 133, the electromagnetic valve 39 is de-energized by the control signal S2. As a result, the control chamber 6a of the actuator 6 is exposed to atmospheric pressure, moving the throttle valve 9 to its maximal open position at which essentially free flow of intake air is allowed. In other words, if the engine 1 has not yet been started, throttling of the intake air flow is inhibited.

A step 134 following the step 133 sets a desired on-duty cycle D1 of the control signal S1 to 0%. This means that the electromagnetic valve 37 is completely de-energized. The step 134 saves electrical power. After the step 134, the program returns to the step 101.

In the step 103, the difference DP between the upstream exhaust pressure EP1 and the downstream exhaust pressure EP2 is calculated.

In a step 104 following the step 103, the control unit 20 determines whether or not the filter 24 is currently subject to the rejuvenating operation, that is, whether or not the filter 24 is being unclogged. Specifically, this determination is made by referring to a section of RAM within the CPU 28 which holds a signal or the value of a variable representing whether or not the filter 24 is being unclogged. If the filter 24 is being rejuvenated, the program advances to a step 108. If the filter 24 is not being rejuvenated, the program advances to a step 105. In the first execution cycle of the program after the engine 1 has been started, the program proceeds from the step 104 to the step 105.

In the step 105, a reference pressure difference DPref1 is derived from the engine speed N and the engine load Q by reference to a table in the ROM 29 containing a set of values of the reference pressure difference which vary as a function of engine speed and engine load. The reference pressure difference DPref1 corresponds to the lower limit of a range of the pressure across the filter 24 within which the degree of clogging of the filter 24 is unacceptable.

A step 106 following the step 105 compares the pressure difference DP to the reference value DPref1 to determine whether or not the degree of clogging of the filter 24 is acceptable. If the pressure difference DP is less than the reference DPref1, that is, if the degree of clogging of the filter 24 is acceptable, the program returns to the step 101 by way of the steps 133 and 134. In this case, the step 133 forces the throttle valve 9 to allow essentially free flow of intake air. If the pressure difference DP is equal to or greater than the reference DPref1, that is, the degree of clogging of the filter is unacceptable, the program advances to a step 107.

In the step 107, a signal or a value held by the RAM within the CPU 28 is adjusted to signify that the filter 24 is being rejuvenated or unclogged. This signal or value is checked in the previously-mentioned step 104 to determine whether or not the filter 24 is subject to the rejuvenating operation. After the step 107, the program advances to the step 108.

The step 108 compares the coolant temperature TW to a reference temperature TWref, e.g., 60° C. This reference TWref corresponds to the lower limit of a range of temperatures high enough to keep the engine 1 operating stably even if intake air flow is throttled. If the coolant temperature TW is lower than the reference TWef, the program returns to the step 101 by way of the steps 133 and 134. In this case, the step 133 forces the throttle valve 9 to allow essentially free flow of intake air. If the coolant temperature TW is equal to or higher than the reference TWref, the program advances to a step 109.

In the step 109, the temperature TE of exhaust from the engine 1 is deduced on the basis of the engine speed N and the engine load Q. The exhaust temperature TE may be determined by referring to a table in the ROM 29 containing a set of values of the exhaust temperature which vary as a function of engine speed and engine load. Then, the exhaust temperature TE is compared to a reference temperature TEref, e.g., 400° C. This reference TEref corresponds to the lower limit of exhaust temperatures high enough to reliably burn off the particles deposited on the filter 24, that is, the lower limit of exhaust temperatures at which the catalyst on the filter 24 is adequately active. If the exhaust temperature TE is equal to or higher than the reference TEref, the program returns to the step 101 by way of the steps 133 and 134. In this case, the step 133 forces the throttle valve 9 to allow essentially free flow of intake air. Accordingly, at exhaust temperatures above 400° C., the intake air flow is not throttled. It should be noted that at these temperatures, the trapped particles can be burned off without reducing the intake air flow. If the exhaust temperature TE is lower than the reference TEref, the program advances to a step 110.

In the step 110, a desired on-duty cycle D1 of the control signal S1 to the electromagnetic valve 37 is determined on the basis of the engine speed N and the engine load Q by reference to a table in the ROM 29 containing a set of values of the basic desired on-duty cycle which vary as a function of engine speed and engine load.

In a step 111 following the step 110, a target pressure IPtar at a point within the air intake passage 8 downstream of the throttle valve 9, that is, a target intake manifold vacuum, is derived from the engine speed N and the engine load Q by referring to a table in the ROM 29 containing a set of values of the target intake air pressure which vary as a function of engine speed and engine load.

In the range below the boundary A of FIG. 3 where engine speed and engine load are generally low and significantly remote from the boundary B corresponding to an exhaust temperature of 400° C., the target intake air pressure IPtar remains at a preset value IPtar0 independent of the engine speed N and the engine load Q. In the range between the boundaries A and B of FIG. 3 where engine speed and engine load are generally intermediate, the target intake air pressure IPtar decreases (the intake manifold vacuum strengthens) as the engine speed N and/or the engine load Q decreases.

In a step 112 following the step 111, the current value of intake air pressure IPact is derived from the signal VIP. The RAM within the CPU 28 holds this value.

A step 113 following the step 112 compares the actual intake air pressure IPact to the target intake air pressure IPtar. If the actual pressure IPact is equal to or lower than the target pressure IPtar, that is, if the valve 9 throttles the intake air flow to a degree greater than a target degree, the program advances to a step 114. If the actual pressure IPact is higher than the target pressure IPtar, that is, if the valve 9 throttles the intake air flow to a degree less than a target degree, the program advances to a step 121.

In the step 114, the CPU 28 calculates the differential value DIP1 which equals the target intake air pressure IPtar minus the actual intake air pressure IPact.

A step 115 following the step 114 compares the pressure difference DIP1 to a preset upper limit or reference DIP1max, e.g., 50 mmHg. If the pressure difference DIP1 is equal to or greater than the upper limit DIP1max, the program advances to a step 116. If the pressure difference DIP1 is smaller than the upper limit DIP1max, the program advances to a step 117.

In the step 116, the desired on-duty cycle of the control signal S1 determined by the step 110 is corrected by setting the value of the variable D1 equal to the present desired on-duty cycle plus a corrective duty cycle, e.g., 20%. In other words, "D1=D1+Dmax" is executed, where Dmax is the corrective duty cycle. After the step 116, the program advances to a step 119.

The step 117 compares the pressure difference DIP1 to a preset lower limit or reference DIP1min, e.g., 20 mmHg. If the pressure difference DIP1 is equal to or greater than the lower limit DIP1min, the program advances to a step 118. If the pressure difference DIP1 is smaller than the lower limit DIP1min, the program advances to the step 119.

In the step 118, the desired on-duty cycle of the control signal S1 determined by the step 110 is corrected by setting the value of the variable D1 equal to the present desired on-duty cycle plus a corrective duty cycle, e.g., 10%. In other words, "D1=D1+Dmin" is executed, where Dmin is the corrective duty cycle. After the step 118, the program advances to the step 119.

The step 119 compares the desired on-duty cycle D1 to an upper limit or reference D1max, e.g., 90%. If the desired on-duty cycle D1 is equal to or greater than the upper limit D1max, the program advances to a step 120. If the desired on-duty cycle D1 is smaller than the upper limit D1max, the program advances to a step 128.

In the step 120, the desired on-duty cycle is corrected by setting the value of the variable D1 equal to the upper limit D1max. Accordingly, the desired on-duty cycle D1 of the control signal S1 remains equal to or below the upper reference D1max. After the step 120, the program advances to the step 128.

The upper limit D1max is chosen so that when the actual on-duty of the control signal S1 to the electromagnetic valve 37 assumes the upper limit D1max, the vacuum within the control chamber 6a of the actuator 6 generates a force opposite to and slightly weaker than the rest-position force of the spring 6c. This choice of the upper limit D1max ensures a quick response of the throttle valve 9 to the variations in the pressure within the control chamber 6a.

In the step 121, the CPU 28 calculates the differential value DIP2 which equals the actual intake air pressure IPact minus the target intake air pressure IPtar.

A step 122 following the step 121 compares the pressure difference DIP2 to a preset upper limit or reference DIP2max, e.g., 50 mm Hg. If the pressure difference DIP2 is equal to or greater than the upper limit DIP2max, the program advances to a step 123. If the pressure difference DIP2 is less than the upper limit DIP2max, the program advances to a step 124.

In the step 123, the desired on-duty cycle of the control signal S1 determined by the step 110 is corrected by setting the value of the variable D1 equal to the present desired on-duty cycle minus a corrective duty cycle, e.g., 20%. In other words, "D1=D1−Dmax" is executed, where Dmax is the corrective duty cycle. After step 123, the program advances to a step 126.

The step 124 compares the pressure difference DIP2 to a preset lower limit or reference DIP2min, e.g., 20 mm Hg. If the pressure difference DIP2 is equal to or greater than the lower limit DIP2min, the program advances to a step 125. If the pressure difference DIP2 is smaller than the lower limit DIP2min, the program advances to the step 126.

In the step 125, the desired on-duty cycle of the control signal S1 determined by the step 110 is corrected by setting the value of the variable D1 equal to the present desired on-duty cycle minus a corrective duty cycle, e.g., 10%. In other words, "D1=D1−Dmin" is executed, where Dmin is the corrective duty cycle. After step 125, the program advances to the step 126.

The step 126 compares the desired on-duty cycle D1 to a lower limit or reference D1min, e.g., 10%. If the desired on-duty cycle D1 is equal to or smaller than the lower limit D1min, the program advances to a step 127. If the desired on-duty cycle D1 is greater than the lower limit D1min, the program advances to the step 128.

In the step 127, the desired on-duty cycle is corrected by setting the value of the variable D1 equal to the lower limit D1min. Accordingly, the desired on-duty cycle D1 of the control signal S1 remains equal to or above the lower reference D1min. After the step 127, the program advances to the step 128.

The lower limit D1min is chosen so that when the actual on-duty of the control signal S1 to the electromagnetic valve 37 assumes the lower limit D1min, the vacuum within the control chamber 6a of the actuator 6 generates a force opposite to and slightly stronger than the force of the spring 6c developed near the maximal lift of the rod 14. This choice of the lower limit D1min ensures a quick response of the throttle valve 9 to variations in the pressure within the control chamber 6a.

In the step 128, the electromagnetic valve 39 is energized by the control signal S2. As a result, the control chamber 6a of the actuator 6 is exposed to the control pressure in the passage 38 which varies in accordance with the duty cycle of the control signal S1 to the electromagnetic valve 37. In this case, the position of the throttle valve 9 and the degree of throttling of the intake air flow are adjusted in accordance with the duty cycle of the control signal S1.

In a step 129 following the step 128, the control signal S1 to the electromagnetic valve 37 is adjusted so that the actual on-duty cycle of the control signal S1 equals the desired on-duty cycle of the control signal S1 represented by the variable D1.

In a step 130 following the step 129, a reference pressure difference DPref2 is derived from the engine speed N and the engine load Q by refering to a table in the ROM 29 containing a set of values of the reference pressure difference which vary as a function of engine speed and engine load. This pressure difference DPref2 corresponds to that developed when almost no particles are trapped on the filter 24, that is, when the degree of clogging of the filter 24 is essentially zero.

In a set 131 following the step 130, the pressure difference DP is compared to the reference DPref2 to determine whether or not the degree of clogging of the filter 24 has become almost nil. If the pressure difference DP is greater than the reference DPref2, that is, if the degree of clogging of the filter 24 is not yet negligible, the program returns to the step 101. In this case, the intake air flow continues to be throttled by the valve 9 so that filter rejuvenating operation continues. If the pressure difference DP is equal to or less than the reference DPref2, that is, the degree of clogging of the filter 24 has become essentially nil, the program advances to a step 132.

The step 132 initializes the signal or value held by the RAM 2 within the CPU 28 which represents whether or not the filter 24 is currently being rejuvenated. Specifically, this signal or value is changed to signify that the filter 24 is not subjected to the rejuvenating operation. After the step 132, the program returns to the step 101 by way of the steps 133 and 134. The step 133 deenergizes the electomagnetic valve 39, thereby interrupting the throttling of the intake air flow and thus suspending rejuvenation of the filter 24.

Figure 3:
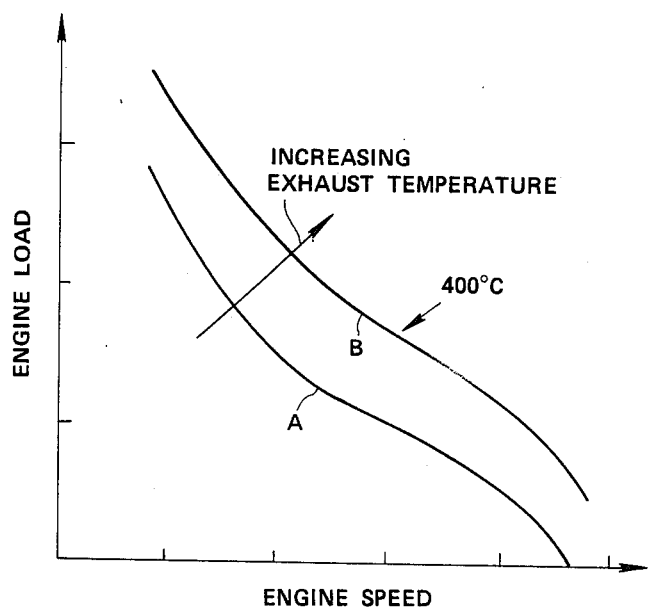
FIG. 3 is a graph of ranges of engine speed and load values identified with different filter rejuvenating operations.

In the range between the boundaries A and B of FIG. 3, the pressure at a point within the intake air passage 8 downstream of the throttle valve 8 is reduced (the intake manifold vacuum is strengthened) with decreases in the engine speed and/or the engine load in order to hold the exhaust temperature at 400° C. The relationship between the intake manifold vacuum and the engine load and also the relationship between the exhaust temperature and the engine load are indicated by the broken-line curves in FIG. 4. Since the exhaust temperature is held at 400° C., the catalyst on the filter 24 remains active so that the trapped particles can be burned off effectively. In addition, since throttling of the intake air flow to an excessive degree is prevented, the rate of production of smoke and engine fuel economy are improved relative to the conventional system, as shown in FIG. 4.

In the range below the boundary A of FIG. 3, since the intake air pressure is held at an essentially constant level as in the conventional system, the filter 24 can be unclogged in a manner similar to that in the conventional system.

Figure 4:
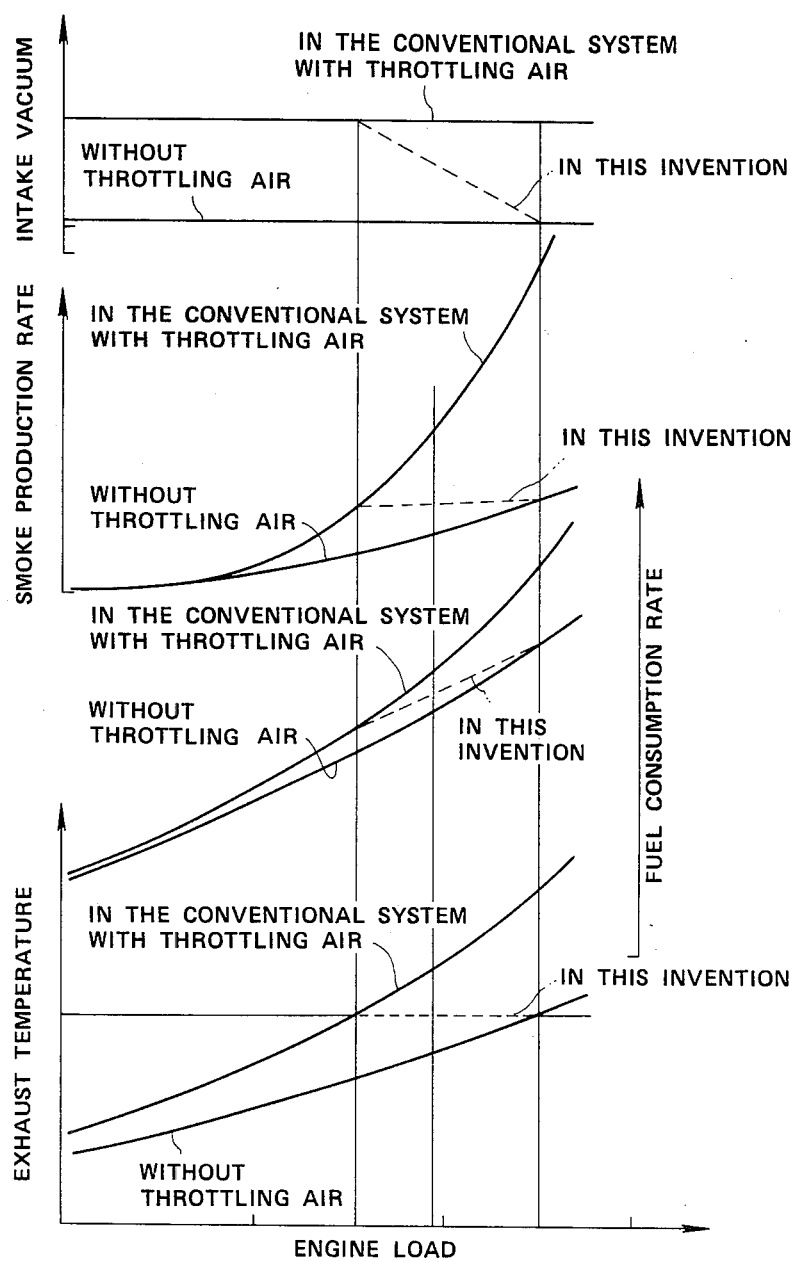
FIG. 4 is a graph of the relationships between exhaust temperature and engine load, between fuel consumption rate and engine load, between smoke production rate and engine load, and between intake manifold vacuum and engine load.

In the range above the boundary B of FIG. 3 corresponding to an exhaust temperature of 400° C., the intake air flow is not throttled so that the rate of production of smoke and engine fuel economy are improved relative to the conventional system as suggested by FIG. 4. It should be noted that at exhaust temperatures above 400° C., the trapped particles can be burned off without throttling the intake air flow.

DESCRIPTION OF THE SECOND PREFERRED EMBODIMENT

Figure 5:
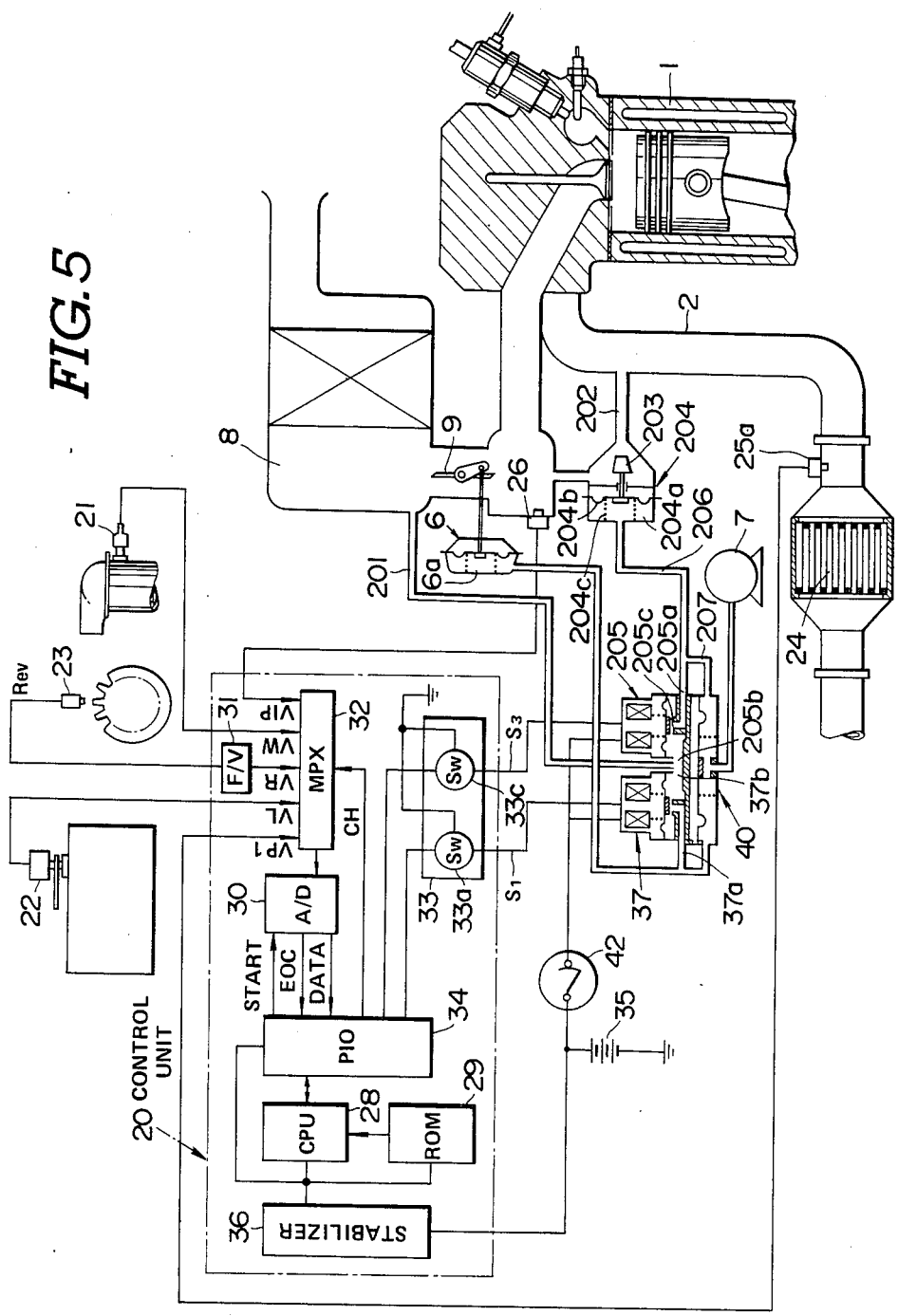
FIG. 5 is a diagram of an exhaust particle removing system according to a second embodiment of this invention.

FIG. 5 shows a second embodiment of this invention. This embodiment is similar to the embodiment of FIGS. 1–4 except for design changes described below.

The downstream pressure sensor 25b (see FIG. 1) is omitted from this embodiment.

The electromagnetic valve 39 (see FIG. 1) is also omitted from this embodiment. The pressure control passage 38 is directly connected to the control chamber 6a of the actuator 6, so that the control pressure within the passage 38 is continually applied to the control chamber 6a. The switch 33b (see FIG. 1) supplying the control signal S2 to the electromagnetic valve 39 is omitted from the switch section 33.

The second port 37b of the electromagnetic valve 37 is connected via a passage 201 to a point of the air intake passage 8 upstream of the throttle valve 9 so that the second port 37b is exposed to atmospheric pressure.

The battery 35 is directly connected to the voltage stabilizer 36.

One end of an exhaust gas recirculation (EGR) passage 202 is connected to a point of the exhaust passage 2 upstream of the filter 24. The other end of the EGR passage 202 is connected to a point of the air intake passage 8 downstream of the throttle valve 9.

A valve 203 disposed in the EGR passage 202 adjusts the rate of EGR through the combustion chambers of the engine 1. It should be noted that throttling the intake air flow by means of the valve 9 facilitates EGR. Accordingly, the rate of EGR is adjusted by controlling the positions of both the EGR valve 203 and the throttle valve 9 simultaneously.

Since the throttle valve 9 is used in both EGR control and filter-rejuvenation control, the cost of the total system can be lowered.

A pressure responsive actuator 204 for driving the EGR valve 203 includes a control chamber 204a, a diaphragm 204b defining part of the control chamber 204a and connected to the EGR valve 203, and a spring 204c biasing the diaghragm 204b. As the pressure within the control chamber 204a varies, the diaphragm 204b deforms and thus the EGR valve 203 moves. Accordingly, the position of the EGR valve 203 depends on the pressure within the control chamber 204a.

An ON/OFF electromagnetic valve 205 includes first and second ports 205a and 205b. The first port 205a is connected to the control chamber 204a of the actuator 204 via a pressure control passage 206. The pressure control passage 206 is connected to the vacuum pump 7 via the pressure adjustment valve 40 and a passage 207 so that the pressure control passage 206 can be exposed to a vacuum. The second port 205b is connected to the atmosphere passage 201 so that the second port 205b is exposed to atmospheric pressure. When the electromagnetic valve 205 is electrically energized, a valve opening 205c between the first and second ports 205a and 205b is unblocked, admitting atmosphere into the control chamber 204a of the actuator 204 and thus increasing the pressure within the control chamber 204a. When the electromagnetic valve 205 is electrically de-energized, the valve opening 205c is blocked, inhibitting admission of atmosphere into the control chamber 204a of the actuator 204 and thus decreasing the pressure within the control chamber 204a.

The switch section 33 includes a switching circuit 33c. The switch 33c has a control terminal receiving a signal from the PIO circuit 34. The switch 33c is closed and opened in accordance with states of this signal. The switch 33c is mainly composed of a switching transistor.

The electromagnetic valve 205 is electrically connected across the battery 35 via the switch 33c and the engine key switch 42. Provided that the key switch 42 is closed, the electromagnetic valve 205 is energized and de-energized when the switch 33c is closed and opened respectively. In other words, the electromagnetic valve 205 is electrically energized and de-energized by a control signal S3 supplied from the switch 33c to the electromagnetic valve 205. This control signal S3 reflects the signal from the PIO circuit 34 to the switch 33c. The control signal S3 is in the form of a pulse train having a frequency in the range of 30–50 Hz so that the electromagnetic valve 205 is periodically energized and de-energized at that frequency. This pulse drive of the electromagnetic valve 205 allows the pressure within the control chamber 204a of the actuator 204 to depend on the duty cycle of the pulse signal S3. Accordingly, the position of the EGR valve 203 depends on the duty cycle of the control signal S3 so that the rate of EGR is also adjusted in accordance with the duty cycle of the control signal S3.

Figure 6A:
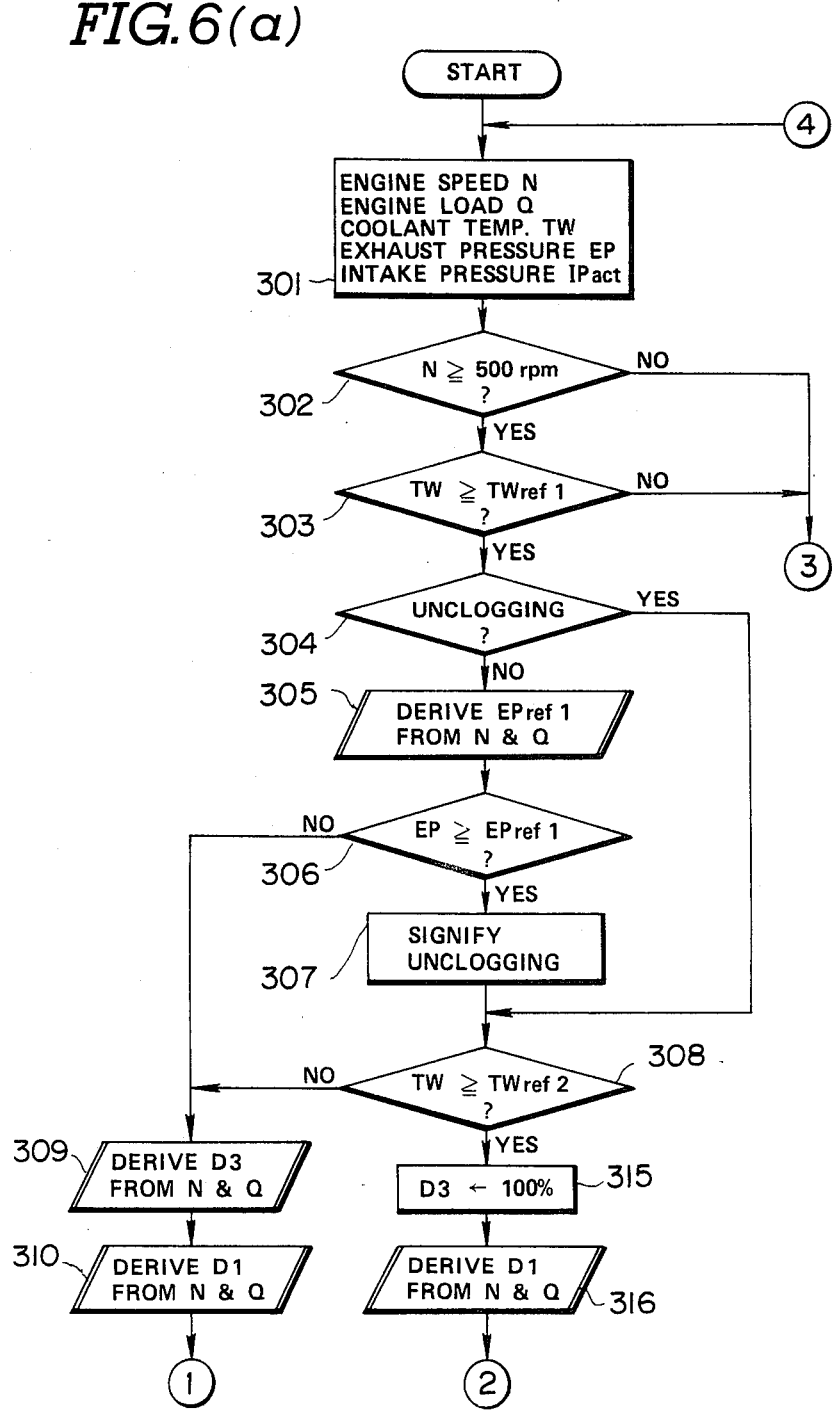

The control unit 20 operates in accordance wih a program stored in the ROM 29. FIGS. 6(a) and 6(b) form a flowchart of this program.

In a step 301 of the program, the current values of engine speed N, Engine load Q, coolant temperature TW, exhaust pressure EP upstream of the filter 24, and intake air prssure IPact downstream of the throttle valve 9 are derived from the signals VR, VL, VW, VP1, and VIP, respectively. The RAM within the CPU 28 holds these values.

A step 302 following the step 301 compares the current engine speed N to a preset engine speed, e.g., 500 rpm. This comparison is to determine whether or not the engine 1 is running. If the engine speed N is equal to or higher than 500 rpm, that is, if the engine 1 has been started, the program advances to a step 303. If the engine speed N is lower than 500 rpm, that is, if the engine 1 is not yet running, the program advances to a step 321.

The step 321 sets both desired on-duty cycles D1 and D3 of the control signals S1 and S3 to 100%. This forces the electromagnetic valves 37 and 205 to be continuously energized so that the valve openings 37c and 205c are also continuously unblocked. Accordingly, the pressures within the control chambers 6a and 204a of the actuators 6 and 204 assume their maximal values. When the pressure within the control chamber 6a is maximized, the throttle valve 9 is in its maximal open position at which essentially free intake air flow is allowed, that is, at which throttling of intake air flow is suspended. When the pressure within the control chamber 204a is maximal, the EGR valve 203 is in its fully-closed position at which EGR is suspended. In this way, when the engine 1 has not yet been started, neither throttling of intake air flow nor EGR is performed. After the step 321, the program advances to a step 322.

In the step 303, the coolant temperature TW is compared to a reference temperature TWref1, e.g., 45° C. This reference TWref1 corresponds to the lower limit of a temperature range within which the engine 1 operates stably even when EGR is performed. If the coolant temperature TW is equal to or greater than the reference TWref1, that is, if the engine temperature is high enough to allow EGR, the program advances to a step 304. If the coolant temperature TW is below the reference TWref1, that is, if the engine temperature is too low to allow EGR, the program advances to the step 321. In this case, neither throttling of intake air flow nor EGR is performed.

The step 304 determines whether or not the filter 24 is currently subject to rejuvenation, that is, whether or not the filter 24 is being unclogged. Specifically, this determination is performed by referring to a section of RAM within the CPU 28 which holds a signal or the value of a variable representing whether or not the filter 24 is being unclogged. If the filter 24 is subject to rejuvenation, the program advances to a step 308. If the filter 24 is not currently undergoing rejuvenation, the program advances to a step 305.

In the step 305, a reference exhaust pressure EPref1 is derived from the engine speed N and the engine load Q by reference to a table in the ROM 29 containing a set of values of the reference pressure which vary as a function of engine speed and engine load. The reference exhaust pressure EPref1 corresponds to the lower limit of a range of the pressure upstream of the filter 24 within which the degree of clogging of the filter 24 is unacceptable.

A step 306 following the step 305 compares the exhaust pressure EP to the reference EPref1 to determine whether or not the degree of clogging of the filter 24 is acceptable. If the exhaust pressure EP is lower than the reference EPref1, that is, if the degree of clogging of the filter 24 is acceptable, the program advances to a step 309. If the exhaust pressure EP is equal to or greater than the reference EPref1, that is, the degree of clogging of the filter is unacceptable, the program advances to a step 307.

In the step 307, a signal or a value held by the RAM within the CPU 28 is adjusted to signify that the filter 24 is being rejuvenated or unclogged. This signal or the value is checked in the previously-mentioned step 304 and also at a later step 323 to determine whether or not the filter 24 is subject to the rejuvenating operation. After the step 307, the program advances to the step 308.

The step 308 compares the coolant temperature TW to a reference temperature TWref2, e.g., 60° C. This reference TWref2 corresponds to the lower limit of a range of temperatures high enough to sustain stable operation of the engine 1 even if the intake air flow is throttled. If the coolant temperature TW is less than the reference TWref2, the program advances to the step 309. If the coolant temperature TW is equal to or greater than the reference TWref2, the program advances to a step 315.

The following steps 309-314 are designed so as to achieve appropriate EGR control without filter rejuvenation.

In the step 309, a desired on-duty cycle D3 of the control signal S3 determining the position of the EGR valve 203 is derived from the engine speed N and the engine load Q by referring to a table in the ROM 29 containing a set of desired on-duty cycles which vary as a function of engine speed and engine load.

In a step 310 following the step 309, a desired on-duty cycle D1 of the control signal S1 determining the position of the throttle valve 9 is derived from the engine speed N and the engine load Q by reference to a table in the ROM 29 containing a set of desired on-duty cycles which vary as a function of engine speed and engine load.

The desired on-duty cycles D1 and D3 of the control signals S1 and S3 derived by the steps 309 and 310 are designed so as to perfom EGR reliably but not necessarily induce filter rejuvenation.

In a step 311 following the step 310, a target pressure IPtar1 at a point within the air intake passage 8 downstream of the throttle valve 9, that is, a target intake manifold vacuum, is derived from the engine speed N and the engine load Q by referring to a table in the ROM 29 containing a set of values of the target intake air pressure which vary as a function of engine speed and engine load. The target intake air pressure values IPtar1 derived in this step 311 fall within a limited range around a given value, e.g., −40 mmHg, within which approximately 30% of the exhaust gas can be recirculated reliably.

A step 312 following the step 311 compares the actual intake air pressure IPact to the target intake air pressure IPtar1. If the actual pressure IPact is equal to or lower than the target pressure IPtar1, that is, if the valve 9 throttles the intake air flow to a degree greater than a target degree, the program advances to a step 314. If the actual pressure IPact is greater than the target pressure IPtar1, that is, if the valve 9 throttles the intake air flow to a degree less than a target degree, the program advances to a step 314.

The step 313 increases the desired on-duty cycle D1 of the control signal S1 by a preset corrective constant, forcing the throttle valve 9 to reduce the degree of throttling of intake air flow. After the step 313, the program advances to the step 322.

The step 314 decreases the desired on-duty cycle D1 of the control signal S1 by a preset corrective constant, forcing the throttle valve 9 to increase the degree of throttling of intake air flow. After the step 314, the program advances to the step 322.

As a result of execution of the steps 313 and 314, the actual intake air pressure will be maintained at essentially the target pressure derived by the step 311.

The control of the positiooin of the EGR valve 203 by the step 319 and also the control of the position of the throttle valve 9 by the steps 310-314 cooperate to provide the following characteristics of EGR in cases where filter rejuvenation is not being performed.

In the range below and inside the boundary E of FIG. 7 where engine speed and engine load are low, the percentage of exhaust gas recirculated can be significant so that emissions of NOx can be effectively reduced. Specifically, the pressures within the control chambers 6a and 204a of the actuators 6 and 204 are kept at low levels, so that the EGR valve 203 opens relatively wide and that the throttle valve 9 reduces the rate of the intake air flow to a significant degree and thus effectively facilitates EGR.

In the range between the lines E and F of FIG. 7 where both engine speed and engine load are intermediate, the percentage of exhaust gas recirculated is limited to values below those in the low-speed and load range inside the boundary E. Specifically, the pressure within the control chamber 204a of the actuator 204 is held to levels at which the EGR valve 203 is open only slightly. EGR reduces NOx emissions. At the same time, the pressure within the control chamber 6a of the actuator 6 is held at its maximal level at which the throttle valve 9 allows essentially free flow of intake air, that is, at which the valve 9 does not throttle the intake air flow. The free intake air flow ensures high engine efficiency.

Figure 7:
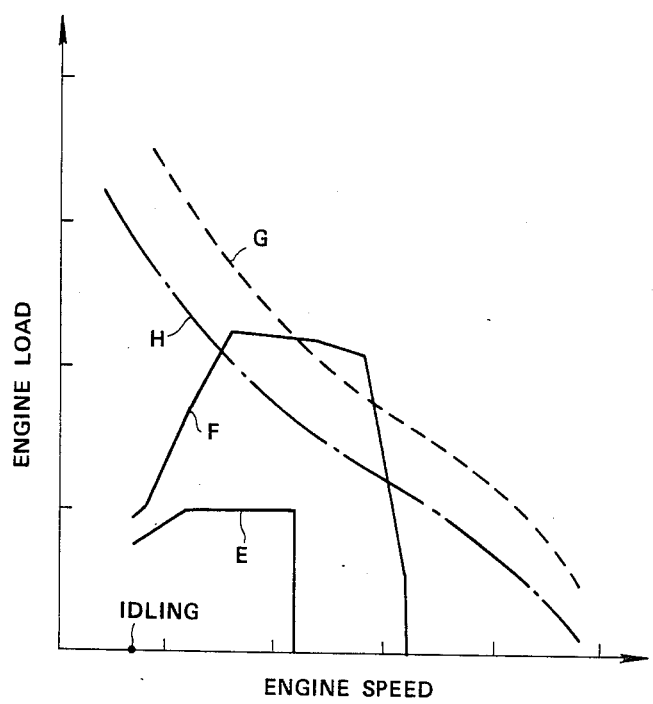
FIG. 7 is a graph similar to FIG. 3, but showing control stages for both filter rejuvenation and EGR, and pertaining to the program illustrated in FIGS. 6(a) and 6(b).

In the range above and outside the boundary F of FIG. 7 where engine speed and engine load are high, EGR is completely suspended. Specifically, the pressures within the control chambers 6a and 204a of the actuators 6 and 204 are kept at their maximal levels, so that the EGR valve 203 is fully closed and the throttle valve 9 allows essentially free flow of intake air. The free intake air flow ensures adequate engine power output.

Returning to FIGS. 6(a) and 6(b), the following steps 315-320 are designed to suspend EGR but to enable filter rejuvenation.

The step 315 sets a desired on-duty cycle D3 of the control signal S3 to 100%. This allows the electromagnetic valve 205 to be continuously energized so that the valve opening 205c is also continuously unblocked. Accordingly, the pressure within the control chamber 204a of the actuator 204 assumes its maximal value. When the pressure within the control chamber 204a is maximized, the EGR valve 203 is in its fully-closed position at which EGR is suspended. In this way, during the filter rejuvenating operation, EGR will be inhibited.

In a step 316 following the step 315, a desired on-duty cycle D1 of the control signal S1 determining the position of the throttle valve 9 is derived from the engine speed N and the engine load Q by referring to a table in the ROM 29 containing a set of desired on-duty cycles which vary as a function of engine speed and engine load. The desired duty cycles D1 derived by this step 316 are designed to cause the exhaust temperature to be high enough to positively induce filter rejuvenation.

In a step 317 following the step 316, a target pressure IPtar2 at a point within the air intake passage 8 downstream of the throttle valve 9, that is, a target intake manifold vacuum, is derived from the engine speed N and the engine load Q by reference to a table in the ROM 29 containing a set of values of the target intake air pressure which vary as a function of engine speed and engine load.

A step 318 following the step 317 compares the actual intake air pressure IPact to the target intake air pressure IPtar2. If the actual pressure IPact is equal to or lower than the target pressure IPtar2, that is, if the valve 9 throttles the intake air flow to a degree greater than a target degree, the program advances to a step 319. If the actual pressure IPact is greater than the target pressure IPtar2, that is, if the valve 9 throttles the intake air flow to a degree less than a target degree, the program advances to a step 320.

The step 319 increases the desired on-duty cycle D1 of the control signal S1 by a preset corrective constant, forcing the throttle valve 9 to reduce the degree of throttling of intake air flow. After the step 319, the program advances to the step 322.

The step 320 decreases the desired on-duty cycle D1 of the control signal S1 by a preset corrective constant, forcing the throttle valve 9 to increase the degree of throttling of intake air flow. After the step 320, the program advances to the step 322.

As a result of execution of the steps 319 and 320, the actual intake air pressure will be maintained at essentially the target pressure derived by the step 317.

The control of the position of the throttle valve 9 by the steps 316-320 provides the following characteristics of filter rejuvenating operation. It should be noted that EGR remains inhibitted by the step 315 during the filter rejuvenating process.

In the range above the boundary G of FIG. 7 where engine speed and engine load are high so that the exhaust temperature is generally high enough to reliably burn off the trapped particles without throttling the intake air flow, the throttle valve 9 is held in or moved into a position at which essentially free flow of intake air is allowed, that is, at which the intake air flow is not throttled. The free intake air flow ensures a high engine efficiency. The boundary G preferably corresponds to an exhaust temperature of 400° C. at and above which the catalyst of the filter 24 is adequately active.

In the range between the lines G and H of FIG. 7 where engine speed and engine load are generally intermediate, the throttle valve 9 reduces the intake air flow and thus decreases the intake air pressure as engine speed and/or engine load decreases. This control of the position of the throttle valve 9 holds the exhaust temperature at approximately 400° C. Accordingly, filter 24 is reliably unclogged while excessive throttling of the intake air flow is prevented. The prevention of the excessive throttling reduces smoke emissions and improves the fuel economy of the engine 1.

In the range below the boundary H of FIG. 7 where engine speed and engine load are generally low, the throttle valve 9 is controlled so that the intake manifold vacuum will remain at a fixed level, e.g., −200 mmHg, independent of the engine speed and the engine load. The fixed intake manifold vacuum is chosen to reliably prevent misfiring.

The control of the position of the throttle valve 9 is generally designed so that the intake manifold vacuum during the filter rejuvenating operation will be stronger than the intake manifold vacuum during EGR.

Returning to FIGS. 6(a) and 6(b), the step 322 sets the actual on-duty cycles of the control signals S1 and S3 equal to the desired on-duty cycles represented by the variables D1 and D3 respectively.

A step 323 following the step 322 determines whether or not the filter 24 is currently subject to rejuvenation, that is, whether or not the filter 24 is being unclogged. Specifically, this is determined by referring to the section of RAM within the CPU 28 which holds a signal or the value of a variable representing whether or not the filter 24 is being unclogged. If the filter 24 is subjected to rejuvenation, the program advances to a step 324. If the filter 24 is not subject to the rejuvenating process, the program returns to the step 301.

In the step 324, a reference exhaust pressure EPref2 is derived from the engine speed N and the engine load Q by reference to a table in the ROM 29 containing a set of values of the reference pressure which vary as a function of engine speed and engine load. The reference exhaust pressure EPref2 is chosen to signify that the filter 24 has been essentially fully unclogged.

A step 325 following the step 324 compares the detected exhaust pressure EP to the reference exhaust pressure EPref2. If the detected pressure EP is eaual to or lower than the reference pressure EPref2, that is, if the filter 24 has been fully unclogged, the program advances to a step 326. If the detected pressure EP is higher than the reference pressure EPref2, that is, if the filter 24 has not yet been fully unclogged, the program returns to the step 301 so that filter rejuvenation continues.

The step 326 initializes the signal or value held by the RAM within the CPU 28 which represents whether or not the filter 24 is being rejuvenated. Specifically, this signal or value held by the RAM is changed to signify that the filter 24 is no longer subject to rejuvenation. After the step 326, the program returns to the step 301.

FIG. 8 is part of a flowchart of a modified program for operating the control unit 20. This modified program is similar to the program of FIGS. 6(a) and 6(b) except for the following design changes.

As shown in FIG. 8, the modified program includes steps 330-332 in place of the steps 315-317 of FIG. 6.

In the step 330 following the step 308, a desired on-duty cycle D3 of the control signal S3 determining the position of the EGR valve 203 is derived from the engine speed N and the engine load Q by referring to a table in the ROM 29 containing a set of desired on-duty cycles which vary as a function of engine speed and engine load. The desired on-duty cycles D3 derived by this step 330 are designed so that the EGR valve 203 allows low rates of EGR in the range below the boundary L of FIG. 9 where the engine speed and the engine load are generally low.

In the step 331 following the step 330, a desired on-duty cycle D1 of the control signal S1 determining the position of the throttle valve 9 is derived from the engine speed N and the engine load Q by referring to a table in the ROM 29 containing a set of desired on-duty cycles which vary as a function of engine speed and engine load.

In the step 332 following the step 331, a target pressure IPtar2 at a point within the air intake passage 8 downstream of the throttle valve 9, that is, the target intake manifold vacuum, is derived from the engine speed N and the engine load Q by referring to a talbe in the ROM 29 containing a set of valves of the target intake air pressure which vary as a function of engine speed and engine load. After the step 332, the program advances to the step 318 (see FIG. 6).

Figure 9:
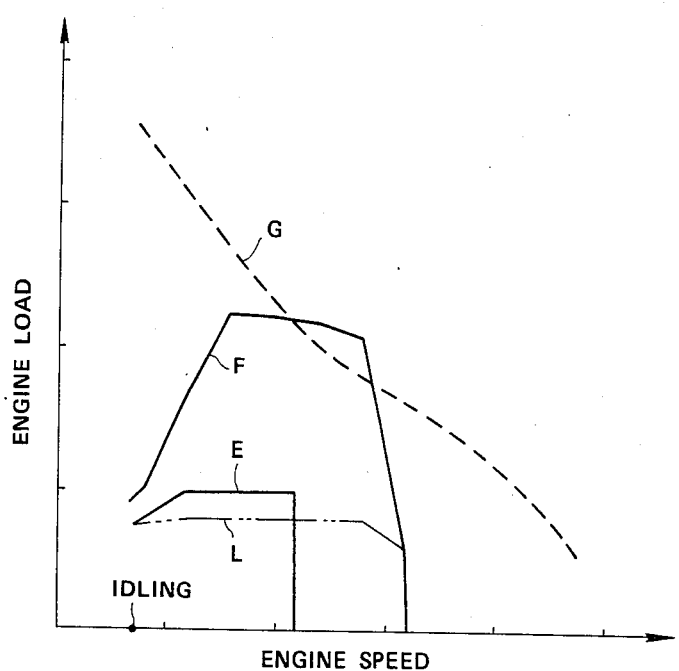
FIG. 9 is a graph similar to FIG. 7, but illustrating different control ranges pertinent to the program of FIG. 8.

The control of the position of the throttle valve 9 by the steps 331 and 332 is designed so that in the range below the boundary G of FIG. 9, the intake manifold vacuum is held at an essentially fixed level at which the exhaust temperature is high enough to burn off the trapped particles. Furthermore, in the range above the boundary G of FIG. 9, essentially free intake air flow is allowed to ensure a high engine efficiency. It should be noted that in this range, the exhaust temperature is high enough to burn off the trapped particles without throttling the intake air flow.

In a portion of the low speed and load range, the steps 330-332 perform both EGR and throttling of the intake air flow so that the filter 24 can be unclogged while NOx emissions are limited.

DESCRIPTION OF THE THIRD PREFERRED EMBODIMENT

Figure 10:
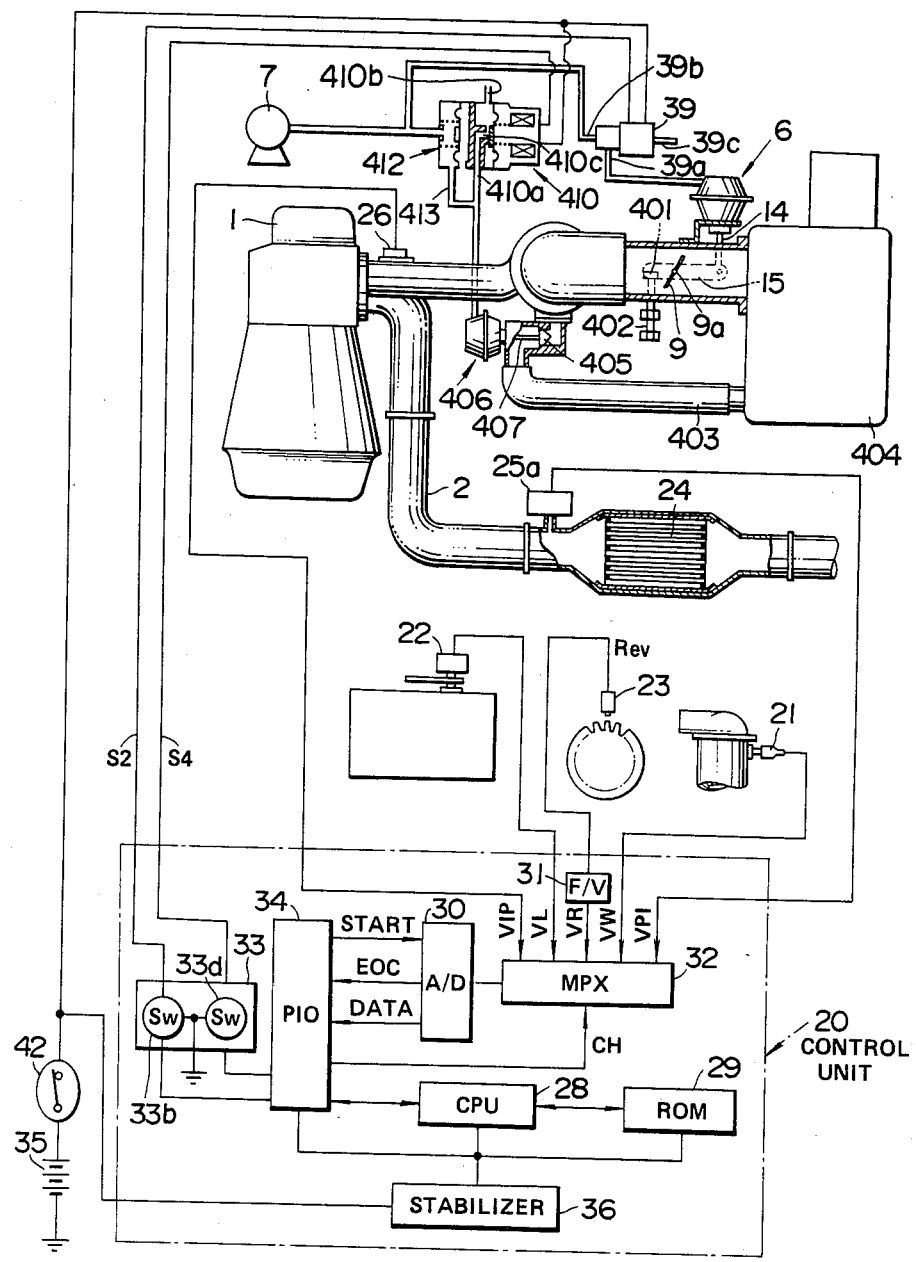
FIG. 10 is a diagram of an exhaust particle removing system according to a third embodiment of this invention.

FIG. 10 shows a third embodiment of this invention. This embodiment is similar to the embodiment of FIGS. 1-4 except for design changes described below.

The downstream pressure sensor 25b (see FIG. 1) is omitted from this embodiment.

The electomagnetic valve 37 (see FIG. 1) is also omitted from this embodiment. The second port 39b of the three-way electromagnetic valve 39 is directly connected to the vacuum pump 7 so that the second port 39b is continually exposed to the vacuum developed by the pump 7. The switch 33a (see FIG. 1) supplying the control signal S1 to the electromagnetic valve 37 is omitted from the switch section 33.

The lever 15 connected to the throttle valve shaft 9a has a stopper 401 which can encounter a screw 402 extending into the air intake passage 8 through the walls defining the passage 8. As the throttle valve 9 closes or moves from a fully open position, movement of the throttle valve 9 continues until the stopper 401 on the lever 15 encounters the end of the screw 402. When the stopper 401 encounters the screw 402, the degree of opening of the throttle valve 9 is minimized. This minimum degree of opening of the throttle valve 9 is chosen to allow the intake air to flow through the valve 9 at a preset, non-zero rate. The minimum degree of opening of the throttle valve 9 can be adjusted by moving the screw 402.

When the electromagnetic valve 39 is de-energized by the control signal S2, the valve first port 39a is connected to the valve third port 39c and is disconnected from the valve second port 39b, exposing the control chamber 6a of the actuator 6 to atmospheric pressure and thereby moving the throttle valve 9 to its fully open position. When the electromagnetic valve 39 is energized by the control signal S2, the valve first port 39a is connected to the valve second port 39b and is disconnected from the valve third port 39c, exposing the control chamber 6a of the actuator 6 to the vacuum and thereby moving the throttle valve 9 to its minimal open position defined by the position of the screw 402.

One end of a passage 403 is connected to a point of the air intake passage 8 upstream of the throttle valve 9, and specifically to an air cleaner 404. The other end of the passage 403 is connected to a point of the air intake passage 8 downstream of the throttle valve 9. Accordingly, the passage 403 bypasses the throttle valve 9 so that intake air can flow through the passage 403 while bypassing the throttle valve 9.

A valve 405 disposed in the bypass passage 403 adjusts the rate of intake air flow bypassing the throttle valve 9. In other words, the bypass valve 405 adjusts the degree of throttling of the intake air flow. Specifically, as the bypass valve 405 opens, the degree of throttling of the intake air flow decreases.

A pressure responsive actuator 405 for driving the bypass valve 405 includes a control chamber, a diaphragm defining part of the control chamber, a spring biasing the diaphragm, and a rod 407 connecting the bypass valve 405 to the diaphragm. As the pressure within the control chamber of the actuator 406 varies, the bypass valve 405 moves and thus the degree of throttling of the intake air flow varies. Accordingly, the position of the bypass valve 405 and also the degree of throttling of the intake air flow depend on the pressure within the control chamber of the actuator 406.

An ON/OFF electromagnetic valve 410 includes first and second ports 410a and 410b. The first port 410a is connected to the control chamber of the actuator 406 via a pressure control passage 411. The pressure control passage 411 is connected to the vacuum pump 7 via a pressure adjustment valve 412 and a passage 413 so that the pressure control passage 411 can be exposed to vacuum. The second port 410b opens to atmosphere so that the second port 410b is exposed to atmospheric pressure. When the electromagnetic valve 410 is electrically energized, a valve opening 410c between the first and second ports 410a and 410b is unblocked, admitting atmosphere into the control chamber of the actuator 406 and thus increasing the pressure within the control chamber of the actuator 406. When the electromagnetic valve 410 is electrically de-energized, the valve opening 410c is blocked, interrupting the admission of atmosphere into the control chamber of the actuator 406 and thus decreasing the pressure within the control chamber of the actuator 406.

The switch section 33 includes a switching circuit 33d. This switch 33d has a control terminal receiving a signal from the PIO circuit 34. The switch 33d is closed and opened in accordance with states of this signal. The switch 33d is mainly composed of a switching transistor.

The electromagnetic valve 410 is electrically connected across the battery 35 via the switch 33d and the engine key switch 42. Provided that the key switch 42 is closed, the electromagnetic valve 410 is energized and de-energized when the switch 33d is closed and opened respectively. In other words, the electromagnetic valve 410 is electrically energized and de-energized by a control signal S4 supplied from the switch 33d to the electromagnetic valve 410. This control signal S4 reflects the signal from the PIO circuit 34 to the switch 33d. The control signal S4 is in the form of a pulse train having a frequency in the range of 30-50 Hz so that the electromagnetic valve 410 is periodically energized and de-energized at that same frequency. This pulse drive of the electromagnetic valve 410 allows the pressure within the control chamber of the actuator 406 to depend on the duty cycle of the pulse signal S4. Accordingly, the position of the bypass valve 405 depends on the duty cycle of the control signal S4 so that the degree of throttling of the intake air flow also varies as a function of the duty cycle of the control signal S4. Specifically, as the on-duty cycle of the control signal S4 decreases, the bypass valve 405 opens more widely and thus the degree of throttling of the intake air flow decreases.

As shown in FIG. 11, as the degree of opening of the throttle valve 9 decreases, the rate of incremental change of the exhaust temperature increases while the intake air pressure drops. In addition, the intake air pressure and the incremental change in exhaust temperature are quite sensitive to the position of the bypass valve 405. Specifically, as the bypass valve 405 opens, the degree of throttling of the intake air flow decreases so that the rate of incremental change of exhaust temperature drops while the intake air pressure rises.

Figure 12A:
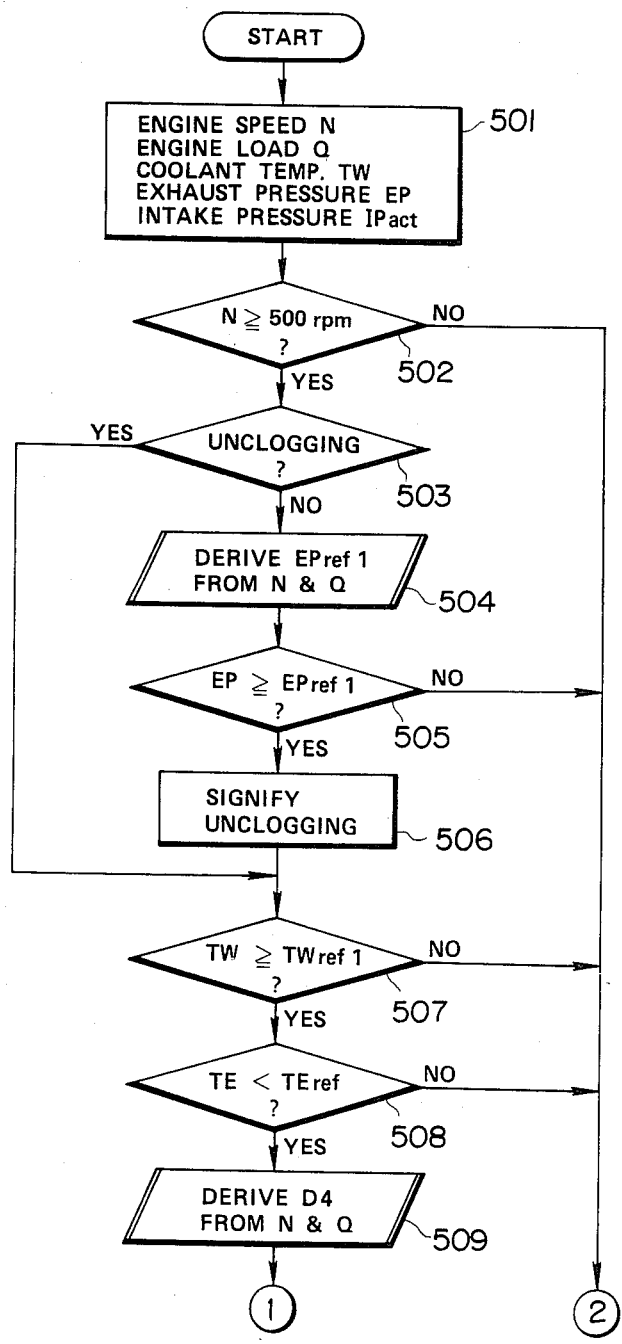
FIGS. 12(a) and 12(b) form a flowchart of a program for operating the control unit of FIG. 10.
Figure 12:
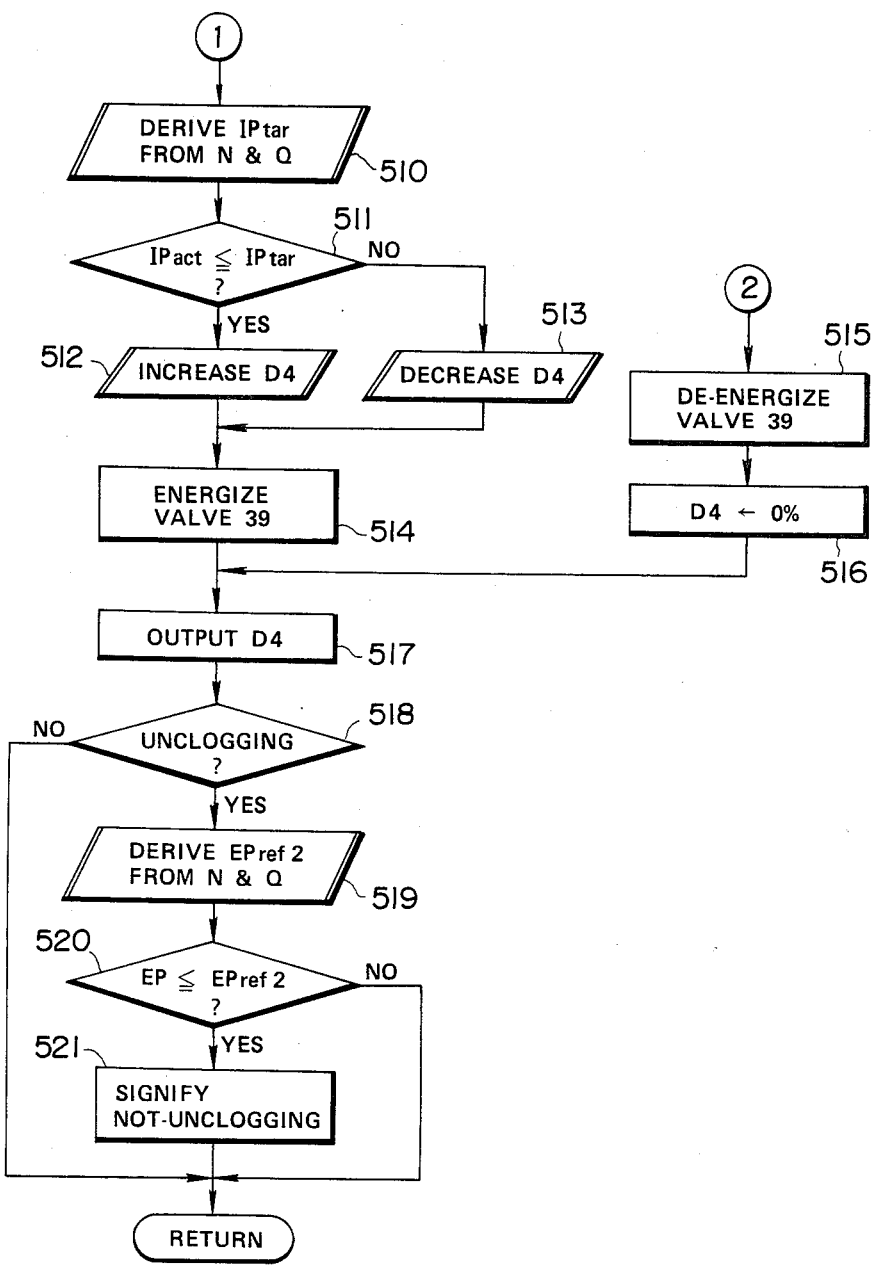

The control unit 20 operates in accordance with a program stored in the ROM 29. FIGS. 12(a) and 12(b) form a flowchart of this program.

In a step 501 of the program, the current values of engine speed N, engine load Q, coolant temperature TW, exhaust pressure EP upstream of the filter 24, and intake air pressure IPact downstream of the throttle valve 9 are derived from the signals VR, VL, VW, VP1, and VIP, respectively. The RAM within the CPU 28 holds these values.

A step 502 following the step 501 compares the current engine speed N to a preset engine speed, e.g., 500 rpm. This comparison is to determine whether or not the engine 1 is running. If the engine speed N is equal to or greater than 500 rpm, that is, if the engine 1 has been started, the program advances to a step 503. If the engine speed N is below 500 rpm, that is, if the engine 1 has not yet been started, the program advances to a step 515.

In the step 515, the electromagnetic valve 39 is de-energized by the control signal S2. As a result, the control chamber 6a of the actuator 6 is exposed to atmospheric pressure, moving the throttle valve 9 to its fully open position.

In a step 516 following the step 515, the desired on-duty cycle D4 of the control signal S4 sent to the electromagnetic valve 410 is set to 0%. This allows the electromagnetic valve 410 to be de-energized continuously. Accordingly, the valve opening 410c is blocked, decreasing or holding the pressure within the control chamber of the actuator 406 to or at its minimal value at which the bypass valve 405 is fully open. After the step 516, the program advances to a step 517.

The steps 515 and 516 prevents throttling of intake air flow when the engine 1 is not yet running.

The step 503 determines whether or not the filter 24 is subject to the rejuvenating process, that is, whether or not the filter 24 is being unclogged. Specifically, this determination is performed by referring to a section of RAM within the CPU 28 which holds a signal or the value of a variable representing whether or not the filter 24 is being unclogged. If the filter 24 is subject to rejuvenation, the program advances to a step 507. If the filter 24 is not being rejuvenated presently, the program advances to a step 504.

In the step 504, a reference exhaust pressure EPref1 is derived from the engine speed N and the engine load Q by referring to a table in the ROM 29 containing a set of values of reference pressure which vary as a function of engine speed and engine load. The reference exhaust pressure EPref1 corresponds to the lower limit of a range of the pressure upstream of the filter 24 within which the degree of clogging of the filter 24 is unacceptable.

A step 505 following the step 504 compares the detected exhaust pressure EP to the reference EPref1 to determine whether or not the degree of clogging of the filter 24 is acceptable. If the exhaust pressure EP is lower than the reference EPref1, that is, if the degree of clogging of the filter 24 is acceptable, the program advances to the step 515. In this case, the steps 515 and 516 prevent throttling of intake air flow. If the exhaust pressure EP is equal to or higher than the reference EPref1, that is, the degree of clogging of the filter 24 is unacceptable, the program advances to a step 506.

In the step 506, a signal or a value held by the RAM within the CPU 28 is adjusted to signify that the filter 24 is being rejuvenated or unclogged. This signal or value is checked in the previously-mentioned step 503 and also a later step 518 to determine whether or not the filter 24 is subject to the rejuvenating process. After the step 506, the program advances to the step 507.

The step 507 compares the coolant temperature TW to a reference temperature TWref1, e.g., 60° C. This reference TWref1 corresponds to the lower limit of a range of temperatures high enough to ensure stable operation of the engine 1 even if intake air flow is throttled. If the coolant temperature TW is less than the reference TWref1, the program advances to the step 515. In this case, the steps 515 and 516 prevent throttling of intake air flow. If the coolant temperature TW is equal to or greater than the reference TWref1, the program advances to a step 508.

In the step 508, the temperature TE of engine exhaust is deduced on the basis of the engine speed N and the engine load Q. The exhaust temperature TE may be determined by referring to a table in the ROM 29 containing a set of values of exhaust temperature which vary as a function of engine speed and engine load. Then, the exhaust temperature TE is compared to a reference temperature TEref, e.g., 400° C. This reference value TEref corresponds to the lower limit of exhaust temperatures high enough to reliably burn off the trapped particles deposited on the filter 24, that is, the lower limit of exhaust temperatures at which the catalyst on the filter 24 is adequately active, even if the intake air flow is not throttled. If the exhaust temperature TE is equal to or higher than the reference TEref, the program advances to the step 515. In this case, the steps 515 and 516 prevent throttling of intake air flow. Accordingly, at exhaust temperatures above 400° C., the intake air flow is not be throttled. It should be noted that at these temperatures, the trapped particles can be burned off without reducing the intake air flow. If the exhaust temperature TE is lower than the reference TEref, the program advances to a step 509.

In the step 509, a desired on-duty cycle D4 of the control signal S4 determining the position of the bypass valve 405 is derived from the engine speed N and the engine load Q by referring to a table in the ROM 29 containing a set of desired on-duty cycles which vary as a function of engine speed and engine load.

In a step 510 following the step 509, a target pressure IPtar at a point within the air intake passage 8 downstream of the throttle valve 9, that is, a target intake manifold vacuum, is derived from the engine speed N and the engine load Q by reference to a table in the ROM 29 containing a set of values of target intake air pressure which vary as a function of engine speed and engine load.

A step 511 following the step 510 compares the actual intake air pressure IPact to the target intake air pressure IPtar. If the actual pressure IPact is equal to or lower than the target pressure IPtar, that is, if the intake air flow is throttled to a degree greater than a target degree, the program advances to a step 512. If the actual pressure IPact is greater than the target pressure IPtar, that is, if the intake air flow is throttled to a degree smaller than a target degree, the program advances to a step 513.

The step 512 increases the desired on-duty cycle D4 of the control signal S4 by a preset corrective constant, more widely opening the bypass valve 405 to reduce the degree of throttling of intake air flow. After the step 512, the program advances to a step 514.

The step 513 decreases the desired on-duty cycle D4 of the control signal S4 by a preset corrective constant, closing the bypass valve 405 and thus increasing the degree of throttling of intake air flow. After the step 513, the program advances to the step 514.

As a result of execution of the steps 512 and 513, the actual intake air pressure will be maintained essentially at the target pressure derived by the step 510.

In the step 514, the electromagnetic valve 39 is energized by the control signal S2. As a result, the control chamber 6a of the actuator 6 is exposed to the maximal vacuum, moving the throttle valve 9 to its minimal open position.

The control of the positions of the throttle valve 9 and the bypass valve 405 is designed to provide the following characteristics of throttling of intake air flow.

In the range below the boundary J of FIG. 13 where engine speed and engine load are generally low and thus inadequate to increase the exhaust temperature to the rejuvenation-enabling temperature, e.g., 400° C. even if the intake air flow is throttled, the intake air flow is throttled in such a way that the intake air pressure is held essentially constant at a preset level, e.g., −200 mmHg. This preset intake air pressure is near the lower limit, e.g., −250 mmHg, of the range of intake air pressures within which the engine 1 can operate stably.

Figure 13:
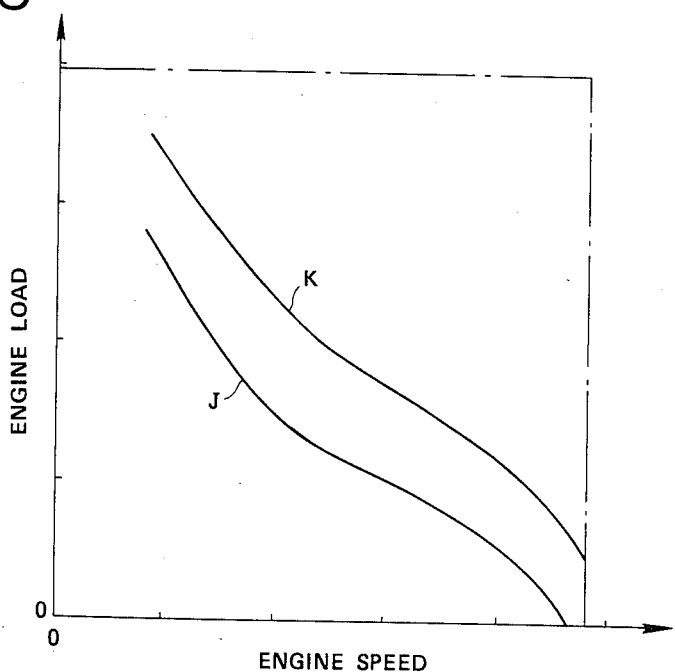
FIG. 13 is a graph similar to FIG. 3 for the program illustrated in FIGS. 12(a) and 12(b).

In the range between the boundaries J and K of FIG. 13 where engine speed and engine load are generally intermediate and thus adequate to increase the exhaust temperature to the rejuvenation-enabling temperature, e.g., 400° C. if the intake air flow is throttled, the degree of throttling of the intake air flow is reduced with increases in engine speed and/or engine load by adjusting the intake air pressure in accordance with the engine speed and/or the engine load. This control of the degree of throttling can normally hold the exhaust temperature essentially constant at the rejuvenation-enabling temperature.

In the range above the boundary K of FIG. 13 where engine speed and engine load are generally high enough to increase the exhaust temperature above the rejuvenation-enabling temperature even if the intake air flow is not throttled, the throttle valve 9 and the bypass valve 405 are both held in their fully open positions so that the intake air flow is not subject to any throttling.

Returning to FIGS. 12(a) and 12(b), the step 517 sets the actual on-duty cycle of the control signal S4 equal to the desired on-duty cycle represented by the variable D4.

A step 518 following the step 517 determines whether or not the filter 24 is currently subject to rejuvenation, that is, whether or not the filter 24 is being unclogged. Specifically, this is determined by referring to the section of RAM within the CPU 28 which holds a signal or the value of a variable representing whether or not the filter 24 is being unclogged. If the filter 24 is subject to the rejuvenating process, the program advances to a step 519. If the filter 24 is not being rejuvenated, the program returns to the step 501.

In the step 519, a reference exhaust pressure EPref2 is derived from the engine speed N and the engine load Q by referring to a table in the ROM 29 containing a set of values of reference pressure which vary as a function of engine speed and engine load. The reference exhaust pressure EPref2 is chosen to signify that the filter 24 has been essentially fully unclogged.

A step 520 following the step 519 compares the detected exhaust pressure EP to the reference exhaust pressure EPref2. If the detected pressure EP is equal to or lower than the reference pressure EPref2, that is, if the filter 24 has been fully unclogged, the program advances to a step 521. If the detected pressure EP is higher than the reference pressure EPref2, that is, if the filter 24 has not yet been fully unclogged, the program returns to the sep 501 so that the filter rejuvenating operation continues. Accordingly, filter rejuvenation continues until the exhaust pressure dropos to the reference pressure. During the filter rejuvenating process, the position of the bypass valve 405 is adjusted so as to maintain the actual intake pressure at essentially the desired intake pressure which varies as a function of engine speed and engine load.

The step 521 initializes the signal or value held by the RAM within the CPU 28 which represents whether or not the filter 24 is currently being rejuvenated. Specifically, this signal or value held by the RAM is changed to signify that the filter 24 is no longer subject to the rejuvenating process. After the step 521, the program returns to the step 501.

What is claimed is:

1. An exhaust particle removing system for an engine, comprising:
   (a) a filter for trapping particles in exhaust from the engine;
   (b) means for determining whether or not the degree of clogging of the filter is unacceptable;
   (c) means for detecting an operating condition of the engine;
   (d) means for, when the degree of clogging of the filter is unacceptable, throttling the flow of intake air into the engine and thus varying the pressure of the intake air in accordance with the detected engine operating condition in cases where the detected engine operating condition resides in a first predetermined range within which the temperature of the engine exhaust would be inadequate to burn off the trapped particles if the intake air flow were not throttled, the throttling means comprising a movable throttle valve disposed in an air intake passage, a bypass passage connected to the air intake passage and bypassing the throttle valve, and a movable bypass valve disposed in the bypass passage; and
   (e) means for, when the degree of clogging of the filter is unacceptable, allowing free flow of the intake air in cases where the detected engine operating condition resides in a second predetermined range within which the temperature of the engine exhaust would be adequate to burn off the trapped particles even if the intake air flow were not throttled.

2. The system of claim 1, wherein the throttling means and the allowing means comprise:
   (a) a movable throttle valve for adjustably determining the rate of the intake air flow, wherein the temperature of the engine exhaust increases as the throttle valve moves from its fully open position and thus reduces the rate of the intake air flow;
   (b) means for deducing the temperature of the engine exhaust from the detected engine operating condition in cases where the throttle valve would be in its fully open position;
   (c) means for determining whether or not the detected engine operating condition resides in the first predetermined range or in the second predetermined range in accordance with the deduced temperature of the engine exhaust;
   (d) means for holding the throttle valve at its fully open position when the detected engine operating condition resides in the first predetermined range; and
   (e) means for moving the throttle valve from its fully open position in accordance with the detected engine operating condition and thereby maintaining the actual temperature of the engine exhaust at essentially a given value when the detected engine operating condition resides in the second predetermined range.

3. The system of claim 2, wherein the throttling means comprises means for sensing the pressure of the intake air, means for deriving a target pressure of the intake air from the detected engine operating condition, and adjusting the position of the throttle valve to equalize the sensed intake air pressure and the target intake air pressure.

4. The system of claim 2, further comprising means for, when the degree of clogging of the filter is unacceptable, maintaining the intake air pressure at essentially a preset value in a third range of the detected engine operating condition within which the temperature of the engine exhaust will be lower than the temperature of the engine exhaust in the second range of the detected engine operating condition.

5. The system of claim 1, wherein the detecting means includes means for sensing the speed of the engine.

6. The system of claim 1, wherein the detecting means includes means for sensing the load on the engine.

7. An exhaust particle removing system for an engine, comprising:
(a) a filter for trapping particles in exhaust from the engine;
(b) means for detecting whether or not the degree of clogging of the filter is unacceptable; and
(c) means for, when the degree of clogging of the filter is unacceptable, throttling the flow of intake air into the engine and thus increasing the temperature of engine exhaust to burn off the particles trapped by the filter, wherein the throttling means comprises a movable throttle valve disposed in an air intake passage, a bypass passage connected to the air intake passage and bypassing the throttle valve, and a movable bypass valve disposed in the bypass passage.

8. The system of claim 7, further comprising:
(a) means for sensing the pressure at a point within the air intake passage downstream of the throttle valve;
(b) means for sensing the rotational speed of the engine;
(c) means for sensing the load on the engine; and
(d) means for determining whether the sensed engine speed and the sensed engine load reside in a first predetermined range corresponding to high engine speeds and loads or in a second predetermined range corresponding to low engine speeds and engine loads;

and wherein the throttling means is operative to, when the sensed engine speed and the sensed engine load reside in the first range, hold the throttle valve and the bypass valve in their fully open positions, and is operative to, when the sensed engine speed and the sensed engine load reside in the second range, hold the throttle valve in its minimal open position and adjust the position of the bypass valve to equalize the sensed intake air pressure and a desired intake air pressure.

9. An apparatus for an internal combustion engine having an intake passage through which air flows to the engine, an exhaust passage through which the engine discharges exhaust gases to the atmosphere, and a filter provided in the exhaust passage for trapping exhaust particles discharged from the engine, comprising:
(a) means sensitive to engine speed for providing a signal indicative of a sensed engine speed;
(b) means sensitive to engine load for providing a signal indicative of a sensed engine load;
(c) means for detecting a requirement for rejuvenation of the filter; and
(d) a control circuit for controlling the air flow to the engine, the control circuit including means for calculating an exhaust gas temperature value as a function of the sensed engine load and the sensed engine speed, means for comparing the calculated exhaust gas temperature value with a predetermined value sufficient to rejuvenate the filter, means for generating a first signal when the calculated exhaust gas temperature is less than the predetermined value in the presence of the requirement for rejuvenation of the filter, and means responsive to the first signal for throttling the air flow to the engine.

10. The apparatus of claim 9, wherein the control circuit includes a throttle valve provided in the intake passage for controlling the air flow to the engine, a bypass passage connected to the intake passage at positions upstream and downstream of the throttle valve, a second valve provided in the bypass passage for controlling air flow therethrough, and a valve driver responsive to the first signal for moving the throttle valve in a closing direction and controlling the second valve to maintain the pressure developed in the intake passage at a point downstream of the throttle valve at a target value.

11. The apparatus of claim 10, wherein the valve driver includes means responsive to the first signal for moving the throttle valve to a predetermined minimal open position.

12. The apparatus of claim 11, wherein the control circuit includes means for calculating the target value as a function of the sensed engine load and the sensed engine speed.

* * * * *